US011334270B2

(12) United States Patent
Kurichiyath et al.

(10) Patent No.: US 11,334,270 B2
(45) Date of Patent: *May 17, 2022

(54) KEY-VALUE STORE USING JOURNALING WITH SELECTIVE DATA STORAGE FORMAT

(71) Applicant: Micron Technology, Inc., Boise, ID (US)

(72) Inventors: Sudheer Kurichiyath, Austin, TX (US); Greg A. Becker, Austin, TX (US); David Boles, Austin, TX (US); Steven Moyer, Round Rock, TX (US); Nabeel Meeramohideen Mohamed, Austin, TX (US); Alexander Tomlinson, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,532

(22) Filed: Nov. 10, 2020

(65) Prior Publication Data

US 2021/0081128 A1    Mar. 18, 2021

Related U.S. Application Data

(63) Continuation of application No. 16/220,646, filed on Dec. 14, 2018, now Pat. No. 10,852,978.

(51) Int. Cl.
*G06F 3/06* (2006.01)
*G06F 16/901* (2019.01)

(52) U.S. Cl.
CPC .......... *G06F 3/0644* (2013.01); *G06F 3/0604* (2013.01); *G06F 3/0631* (2013.01); *G06F 3/0683* (2013.01); *G06F 16/9027* (2019.01)

(58) Field of Classification Search
CPC .... G06F 3/0604; G06F 3/0631; G06F 3/0644; G06F 3/0655; G06F 3/0683; G06F 16/2246; G06F 16/322; G06F 16/9027
USPC .................................. 707/797; 711/154, 170
See application file for complete search history.

(56) References Cited

U.S. PATENT DOCUMENTS

| 5,204,958 | A  | 4/1993 | Cheng et al. |
| 5,530,850 | A  | 6/1996 | Ford et al.  |
| 6,175,835 | B1 | 1/2001 | Shadmon      |
| 6,597,957 | B1 | 7/2003 | Beakley      |

(Continued)

FOREIGN PATENT DOCUMENTS

| CN | 102929793   | 2/2013 |
| CN | 102971732 A | 3/2013 |

(Continued)

OTHER PUBLICATIONS

U.S. Appl. No. 15/428,877 U.S. Pat. No. 10,725,988, filed Feb. 9, 2017, KVS Tree.

(Continued)

*Primary Examiner* — Gary J Portka
(74) *Attorney, Agent, or Firm* — Schwegman Lundberg & Woessner, P.A.

(57) ABSTRACT

Aspects of the present disclosure provide for operations of a key-value store (KVS) that uses journaling with storage of data (e.g., key data or value data of a key-value pair) in different types of data storage objects (e.g., data storage formats) selected based on one or more criteria.

20 Claims, 11 Drawing Sheets

(56) References Cited

U.S. PATENT DOCUMENTS

| | | |
|---|---|---|
| 8,738,657 B2 | 5/2014 | Kuno et al. |
| 9,075,710 B2 | 7/2015 | Talagala et al. |
| 9,367,260 B1 | 6/2016 | Natanzon |
| 9,400,816 B1 | 7/2016 | Gubarev et al. |
| 9,858,301 B1 | 1/2018 | Hardy et al. |
| 10,235,257 B1 | 3/2019 | Danilov et al. |
| 10,706,105 B2 | 7/2020 | Boles |
| 10,706,106 B2 | 7/2020 | Boles et al. |
| 10,719,495 B2 | 7/2020 | Boles et al. |
| 10,725,988 B2 | 7/2020 | Boles et al. |
| 10,852,978 B2 | 12/2020 | Kurichiyath et al. |
| 10,915,546 B2 | 2/2021 | Tomlinson |
| 10,936,661 B2 | 3/2021 | Burton et al. |
| 11,048,755 B2 | 6/2021 | Tomlinson |
| 11,100,071 B2 | 8/2021 | Tomlinson et al. |
| 2003/0176931 A1 | 9/2003 | Pednault et al. |
| 2004/0227758 A1 | 11/2004 | Curry et al. |
| 2005/0165865 A1 | 7/2005 | Farmer |
| 2005/0171960 A1 | 8/2005 | Lomet |
| 2007/0071243 A1 | 3/2007 | Nanda |
| 2008/0016066 A1 | 1/2008 | Kuznetsov et al. |
| 2010/0146003 A1 | 6/2010 | Bruso et al. |
| 2010/0246446 A1 | 9/2010 | Du et al. |
| 2010/0262617 A1 | 10/2010 | Shinjo et al. |
| 2010/0281013 A1 | 11/2010 | Graefe |
| 2011/0246503 A1 | 10/2011 | Bender et al. |
| 2012/0011106 A1 | 1/2012 | Reid et al. |
| 2012/0072656 A1 | 3/2012 | Archak et al. |
| 2012/0223889 A1 | 9/2012 | Medlock et al. |
| 2012/0278335 A1 | 11/2012 | Bentkofsky et al. |
| 2013/0080473 A1 | 3/2013 | Kuno et al. |
| 2013/0103658 A1 | 4/2013 | Travis |
| 2013/0117524 A1 | 5/2013 | Helman et al. |
| 2013/0204902 A1 | 8/2013 | Wang et al. |
| 2013/0218840 A1 | 8/2013 | Smith et al. |
| 2013/0275656 A1 | 10/2013 | Talagala et al. |
| 2013/0306276 A1 | 11/2013 | Duchesneau |
| 2014/0064490 A1 | 3/2014 | Wang et al. |
| 2014/0074841 A1 | 3/2014 | Majnemer et al. |
| 2014/0082028 A1 | 3/2014 | Sivasubramanian et al. |
| 2014/0129530 A1 | 5/2014 | Raufman |
| 2014/0222870 A1 | 8/2014 | Zhang |
| 2014/0279944 A1 | 9/2014 | Ghandeharizadeh et al. |
| 2014/0344287 A1 | 11/2014 | Carvalho et al. |
| 2015/0058291 A1 | 2/2015 | Earl et al. |
| 2015/0127658 A1 | 5/2015 | Ding et al. |
| 2015/0178375 A1 | 6/2015 | Ishizaki |
| 2015/0244558 A1 | 8/2015 | Tully et al. |
| 2015/0254272 A1 | 9/2015 | Regni et al. |
| 2015/0286695 A1 | 10/2015 | Kadayam et al. |
| 2015/0293958 A1 | 10/2015 | Chen et al. |
| 2015/0347495 A1 | 12/2015 | Wang et al. |
| 2016/0026666 A1 | 1/2016 | Namiki |
| 2016/0173445 A1 | 6/2016 | Mosko et al. |
| 2016/0275094 A1 | 9/2016 | Lipcon |
| 2016/0335299 A1 | 11/2016 | Vemulapati et al. |
| 2017/0017411 A1 | 1/2017 | Choi et al. |
| 2017/0141791 A1 | 5/2017 | Balegar et al. |
| 2017/0185622 A1 | 6/2017 | Prahlad et al. |
| 2017/0192989 A1 | 7/2017 | Georgiev et al. |
| 2017/0212680 A1 | 7/2017 | Waghulde |
| 2018/0011766 A1 | 1/2018 | Lee et al. |
| 2018/0067975 A1 | 3/2018 | Kato et al. |
| 2018/0089074 A1 | 3/2018 | Li et al. |
| 2018/0225315 A1 | 8/2018 | Boles et al. |
| 2018/0225316 A1 | 8/2018 | Boles et al. |
| 2018/0225321 A1 | 8/2018 | Boles et al. |
| 2018/0225322 A1 | 8/2018 | Boles et al. |
| 2018/0253386 A1 | 9/2018 | Qiu et al. |
| 2019/0034427 A1 | 1/2019 | Trika et al. |
| 2019/0065557 A1 | 2/2019 | Boles et al. |
| 2020/0004851 A1 | 1/2020 | Lambov |
| 2020/0117728 A1 | 4/2020 | Tomlinson et al. |
| 2020/0117744 A1 | 4/2020 | Tomlinson |
| 2020/0192590 A1 | 6/2020 | Kurichiyath et al. |
| 2020/0192940 A1 | 6/2020 | Tomlinson |
| 2020/0210482 A1 | 7/2020 | Becker et al. |
| 2020/0257669 A1 | 8/2020 | Boles et al. |
| 2020/0293499 A1* | 9/2020 | Kohli ............... G06F 3/067 |
| 2020/0334294 A1 | 10/2020 | Boles et al. |
| 2020/0334295 A1 | 10/2020 | Boles et al. |
| 2020/0349139 A1 | 11/2020 | Boles et al. |
| 2021/0133208 A1 | 5/2021 | Tomlinson |
| 2021/0157852 A1 | 5/2021 | Burton et al. |

FOREIGN PATENT DOCUMENTS

| | | |
|---|---|---|
| CN | 101515298 B | 9/2013 |
| CN | 104156278 | 11/2014 |
| CN | 105095287 A | 11/2015 |
| CN | 105814846 A | 7/2016 |
| CN | 106021266 A | 10/2016 |
| CN | 106970936 A | 7/2017 |
| CN | 107851102 A | 3/2018 |
| CN | 110268394 A | 9/2019 |
| CN | 110268399 A | 9/2019 |
| CN | 110291518 A | 9/2019 |
| CN | 110383261 A | 10/2019 |
| CN | 113039547 | 6/2021 |
| CN | 113168408 | 7/2021 |
| CN | 113196259 | 7/2021 |
| CN | 113196260 | 7/2021 |
| JP | 2011233063 | 11/2011 |
| JP | 2017021494 | 1/2017 |
| KR | 20020059238 A | 7/2002 |
| KR | 20040103495 | 12/2004 |
| KR | 20130018602 A | 2/2013 |
| KR | 20130115929 A | 10/2013 |
| KR | 20170008152 A | 1/2017 |
| KR | 102266756 | 6/2021 |
| KR | 102289332 | 8/2021 |
| KR | 102290835 | 8/2021 |
| KR | 102307957 B1 | 10/2021 |
| TW | 200421114 A | 10/2004 |
| TW | 200822066 A | 5/2008 |
| TW | 200836084 A | 9/2008 |
| TW | 201342088 A | 10/2013 |
| TW | 201408070 A | 2/2014 |
| TW | I454166 B | 9/2014 |
| TW | 201837720 A | 10/2018 |
| TW | 201841122 A | 11/2018 |
| TW | 201841123 A | 11/2018 |
| TW | 201842454 A | 12/2018 |
| WO | WO-2018148149 A1 | 8/2018 |
| WO | WO-2018148151 A1 | 8/2018 |
| WO | WO-2018148198 A1 | 8/2018 |
| WO | WO-2018148203 A1 | 8/2018 |
| WO | WO-2020076580 A1 | 4/2020 |
| WO | WO-2020076581 A1 | 4/2020 |
| WO | WO-2020123628 A1 | 6/2020 |
| WO | WO-2020123632 A1 | 6/2020 |

OTHER PUBLICATIONS

U.S. Appl. No. 16/856,920, filed Apr. 23, 2020, KVS Tree.
U.S. Appl. No. 15/428,912 U.S. Pat. No. 10,706,105, filed Feb. 9, 2017, Merge Tree Garbage Metrics.
U.S. Appl. No. 16/921,371, filed Jul. 6, 2020, Merge Tree Garbage Metrics.
U.S. Appl. No. 15/428,951 U.S. Pat. No. 10,706,106, filed Feb. 9, 2017, Merge Tree Modifications for Maintenance Operations.
U.S. Appl. No. 16/921,309, filed Jul. 6, 2020, Merge Tree Modifications for Maintenance Operations.
U.S. Appl. No. 15/428,976 U.S. Pat. No. 10,719,495, filed Feb. 9, 2017, Stream Selection for Multi-stream Storage Devices.
U.S. Appl. No. 16/933,532, filed Jul. 20, 2020, Stream Selection for Multi-stream Storage Devices.
U.S. Appl. No. 16/220,646 U.S. Pat. No. 10,852,978, filed Dec. 14, 2018, Key-Value Store Using Journaling With Selective Data Storage Format.
U.S. Appl. No. 16/156,440, filed Oct. 10, 2018, Key-Value Store Tree Data Block Spill With Compaction.

(56) References Cited

OTHER PUBLICATIONS

U.S. Appl. No. 16/220,729, filed Dec. 14, 2018, Key-Value Store Tree With Selective Use of Key Portion.
U.S. Appl. No. 16/156,400 U.S. Pat. No. 10,915,546, filed Oct. 10, 2018, Counter-Based Compaction of Key-Value Store Tree Data Block.
U.S. Appl. No. 17/146,222, filed Jan. 11, 2021, Counter-Based Compaction of Key-Value Store Tree Data Block.
U.S. Appl. No. 16/232,422 U.S. Pat. No. 10,936,661, filed Dec. 26, 2018, Data Tree With Order-Based Node Traversal.
U.S. Appl. No. 17/164,299, filed Feb. 1, 2021, Data Tree With Order-Based Node Traversal.
"Korean Application Serial No. 10-2019-7026304, Notice of Preliminary Rejection dated Nov. 30, 2020", w/ English translation, 9 pgs.
"Korean Application Serial No. 10-2019-7026304, Response filed Jan. 28, 2021 to Notice of Preliminary Rejection dated Nov. 30, 2020", w/ English Claims, 26 pgs.
"Korean Application Serial No. 10-2019-7026327, Response filed Dec. 18, 2020 to Notice of Preliminary Rejection dated Oct. 19, 2020", w/ English Claims, 51 pgs.
"Korean Application Serial No. 10-2019-7026330, Notice of Preliminary Rejection dated Nov. 30, 2020", w/ English translation, 10 pgs.
"Korean Application Serial No. 10-2019-7026330, Response filed Feb. 1, 2021 to Notice of Preliminary Rejection dated Nov. 30, 2020", w/ English Claims, 31 pgs.
"Korean Application Serial No. 10-2019-7026533, Notice of Preliminary Rejection dated Dec. 26, 2020", w/ English translation, 12 pgs.
"Korean Application Serial No. 10-2019-7026327, Notice of Preliminary Rejection dated Oct. 19, 2020", w/ English translation, 20 pgs.
"Taiwanese Application Serial No. 107104566, Response filed Jul. 28, 2020 to Decision of Rejection dated Jan. 20, 2020", w/ English Claims, 36 pgs.
Bagwell, Phil, "Ideal Hash Trees", EPFL Technical Report, (2001), 19 pgs.
"International Application Serial No. PCT/US2018/016892, International Preliminary Report on Patentability dated Aug. 22, 2019", 11 pgs.
"International Application Serial No. PCT/US2018/016892, International Search Report dated Jun. 4, 2018", 3 pgs.
"International Application Serial No. PCT/US2018/016892, Written Opinion dated Jun. 4, 2018", 9 pgs.
"International Application Serial No. PCT/US2018/016906, International Preliminary Report on Patentability dated Aug. 22, 2019", 11 pgs.
"International Application Serial No. PCT/US2018/016906, International Search Report dated Jun. 4, 2018", 3 pgs.
"International Application Serial No. PCT/US2018/016906, Written Opinion dated Jun. 4, 2018", 9 pgs.
"International Application Serial No. PCT/US2018/017043, International Preliminary Report on Patentability dated Aug. 22, 2019", 9 pgs.
"International Application Serial No. PCT/US2018/017043, International Search Report dated May 28, 2018", 3 pgs.
"International Application Serial No. PCT/US2018/017043, Written Opinion dated May 28, 2018", 7 pgs.
"International Application Serial No. PCT/US2018/017056, International Preliminary Report on Patentability dated Aug. 22, 2019", 9 pgs.
"International Application Serial No. PCT/US2018/017056, International Search Report dated Jun. 4, 2018", 4 pgs.
"International Application Serial No. PCT/US2018/017056, Written Opinion dated Jun. 4, 2018", 7 pgs.
"International Application Serial No. PCT/US2019/054243, International Search Report dated Jan. 22, 2020", 3 pgs.
"International Application Serial No. PCT/US2019/054243, Written Opinion dated Jan. 22, 2020", 4 pgs.
"International Application Serial No. PCT/US2019/054254, International Search Report dated Jan. 15, 2020", 3 pgs.
"International Application Serial No. PCT/US2019/054254, Written Opinion dated Jan. 15, 2020", 4 pgs.
"International Application Serial No. PCT/US2019/065692, International Search Report dated Apr. 3, 2020", 3 pgs.
"International Application Serial No. PCT/US2019/065692, Written Opinion dated Apr. 3, 2020", 4 pgs.
"International Application Serial No. PCT/US2019/065702, International Search Report dated Apr. 3, 2020", 3 pgs.
"International Application Serial No. PCT/US2019/065702, Written Opinion dated Apr. 3, 2020", 5 pgs.
"NVM Express Revision 1.2 specification", NVM Express, [Online] Retrieved from the internet: <http://nvmexpress.org/resources/specifications>, (Nov. 3, 2014), 1-205.
"Taiwanese Application Serial No. 107104242, Office Action dated Feb. 25, 2019", w/ English Translation, 22 pgs.
"Taiwanese Application Serial No. 107104242, Office Action dated Oct. 2, 2019", w/ English translation, 31 pgs.
"Taiwanese Application Serial No. 107104242, Response filed Jan. 2, 2020 to Office Action dated Oct. 2, 2019", w/ English Claims, 103 pgs.
"Taiwanese Application Serial No. 107104242, Response filed Jun. 4, 2019 to Office Action dated Feb. 25, 2019", w/ English Claims, 105 pgs.
"Taiwanese Application Serial No. 107104545, First Office Action dated Apr. 11, 2019", w/ English translation, 44 pgs.
"Taiwanese Application Serial No. 107104545, Office Action dated Dec. 21, 2018", W/ English Translation, 17 pgs.
"Taiwanese Application Serial No. 107104545, Response filed Mar. 19, 2019 to Office Action dated Dec. 21, 2018", w/English Claims, 15 pgs.
"Taiwanese Application Serial No. 107104545, Response filed Jul. 12, 2019 to First Office Action dated Apr. 11, 2019", w/ English Claims, 124 pgs.
"Taiwanese Application Serial No. 107104545, Voluntary Amendment Filed Sep. 5, 2019", w/ English Claims, 113 pgs.
"Taiwanese Application Serial No. 107104550, Office Action dated Jan. 9, 2019", W/ English Translation, 28 pgs.
"Taiwanese Application Serial No. 107104550, Response filed Apr. 11, 2019 to Office Action dated Jan. 9, 2019", w/ English Claims, 93 pgs.
"Taiwanese Application Serial No. 107104566, Decision of Rejection dated Jan. 20, 2020", w/ English Translation, 7 pgs.
"Taiwanese Application Serial No. 107104566, First Office Action dated Feb. 14, 2019", w/ English Translation, 36 pgs.
"Taiwanese Application Serial No. 107104566, Response filed Aug. 15, 2019 to First Office Action dated Feb. 14, 2019", w/ English Claims, 104 pgs.
"Transaction Log", Wikipedia, (Accessed on Apr. 8, 2019), 3 pgs.
"Xingbo Wu and Yuehai Xu", LSM-trie: An LSM-tree-based Ultra-Large Key-Value Store for Small Data, https://www.usenix.org/system/files/conference/atc15/atc15-paper-wu.pdf, (Jul. 8-10, 2015), 13 pgs.
Amur, Hrishikesh, et al., "Design of a Write-Optimized Data Store", [Online] Retrieved from the internet: <https://smartech.gatech.edu/handle/1853/53627>, (2013), 12 pgs.
Clements, Austin T, et al., "Scalable Address Spaces Using RCU Balanced Trees", (2012), 12 pgs.
Ghosh, Mainak, et al., "Fast Compaction Algorithms for NoSQL Databases", IEEE 35th International Conference on Distributed Computing Systems, (2015), 10 pgs.
Kang, Jeong-Uk, et al., "The Multi-streamed Solid-State Drive", 5 pgs.
Lim, Heyontaek, et al., "Towards Accurate and Fast Evaluation of Multi-Stage Log-Structured Designs", USENIX Association 14th USENIX Conference on File and Storage Technologies FAST 16, (2016), 149-166.
Lu, Lanyue, et al., "WiscKey: Separating Keys from Values in SSD-conscious Storage", 14th USENIX Conference, (2016), 17 pgs.
O'Neil, Patrick E., et al., "The Log-Structured Merge-Tree", ACTA Informatica 33(4), (1996).

(56) References Cited

OTHER PUBLICATIONS

Papapetrou, Odysseas, et al., "Cardinality estimation and dynamic length adaptation for Bloom filters", 34 pgs.

Peng, Wang, et al., "An Efficient Design and Implementation of LSM-Tree based Key-Value Store on Open-Channel SSD", Proceedings of the Ninth European Conference on Computer Systems (EuroSys 2014), Article No. 6, (Apr. 2014), 14 pgs.

Putze, Felix, et al., "Cache-, Hash- and Space-Efficient Bloom Filters", (2007), 14 pgs.

Trong-Dat, Nguyen, et al., "Opportunity of using Multi-Streamed SSD in MongoDB", In: Korea Computer Congress 2016, [Online] Retrieved from the internet: <http://www.dbpia.co.kr/Article/NODE07018146>, (Jun. 2016), 169-171.

Xingbo, Wu, et al., "LSM-trie: An LSM-tree-based Ultra-Large Key-Value Store for Small Data", Proceedings of 2015 USENIX Annual Technical Conference,, (Jul. 8-10, 2015), 71-82.

Yuzhe, Tang, et al., "Deferred Lightweight Indexing for Log-Structured Key-Value Stores", 15th IEEE/ACM International Symposium on Cluster, Cloud and Grid Computing (CCGrid), (May 4-7, 2015), 10 pgs.

"International Application Serial No. PCT US2019 065692, International Preliminary Report on Patentability dated Jun. 24, 2021", 6 pgs.

"International Application Serial No. PCT US2019 065702, International Preliminary Report on Patentability dated Jun. 24, 2021", 7 pgs.

"Chinese Application Serial No. 201980074795.1, Voluntary Amendment Filed Oct. 15, 2021", w/ English Claims, 30 pgs.

"Chinese Application Serial No. 201980083131.1, Office Action dated Nov. 19, 2021", w/o English translation, 5 pgs.

U.S. Appl. No. 16/156,440, Notice of Allowance dated Apr. 21, 2021, 15 pgs.

U.S. Appl. No. 16/220,729, Corrected Notice of Allowability dated Mar. 10, 2021, 2 pgs.

U.S. Appl. No. 16/220,729, Corrected Notice of Allowability dated Mar. 24, 2021, 2 pgs.

U.S. Appl. No. 16/220,729, Corrected Notice of Allowability dated Jun. 3, 2021, 2 pgs.

"International Application Serial No. PCT/US2019/054243, International Preliminary Report on Patentability dated Apr. 22, 2021", 6 pgs.

"International Application Serial No. PCT/US2019/054254, International Preliminary Report on Patentability dated Apr. 22, 2021", 6 pgs.

"Korean Application Serial No. 10-2019-7026533, Response filed Feb. 17, 2021 to Notice of Preliminary Rejection dated Dec. 26, 2020", w/ English Claims, 33 pgs.

"Chinese Application Serial No. 201980074795.1, Office Action dated Dec. 6, 2021", w English translation, 10 pgs.

\* cited by examiner

KEY-VALUE STORE USING JOURNALING WITH SELECTIVE DATA STORAGE FORMAT

PRIORITY APPLICATION

This application is a continuation of U.S. application Ser. No. 16/220,646, filed Dec. 14, 2018, which is incorporated herein by reference in its entirety.

TECHNICAL FIELD

Embodiments of the disclosure relate generally to memory sub-systems and more specifically, to operations for a key-value store (KVS) that uses journaling.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
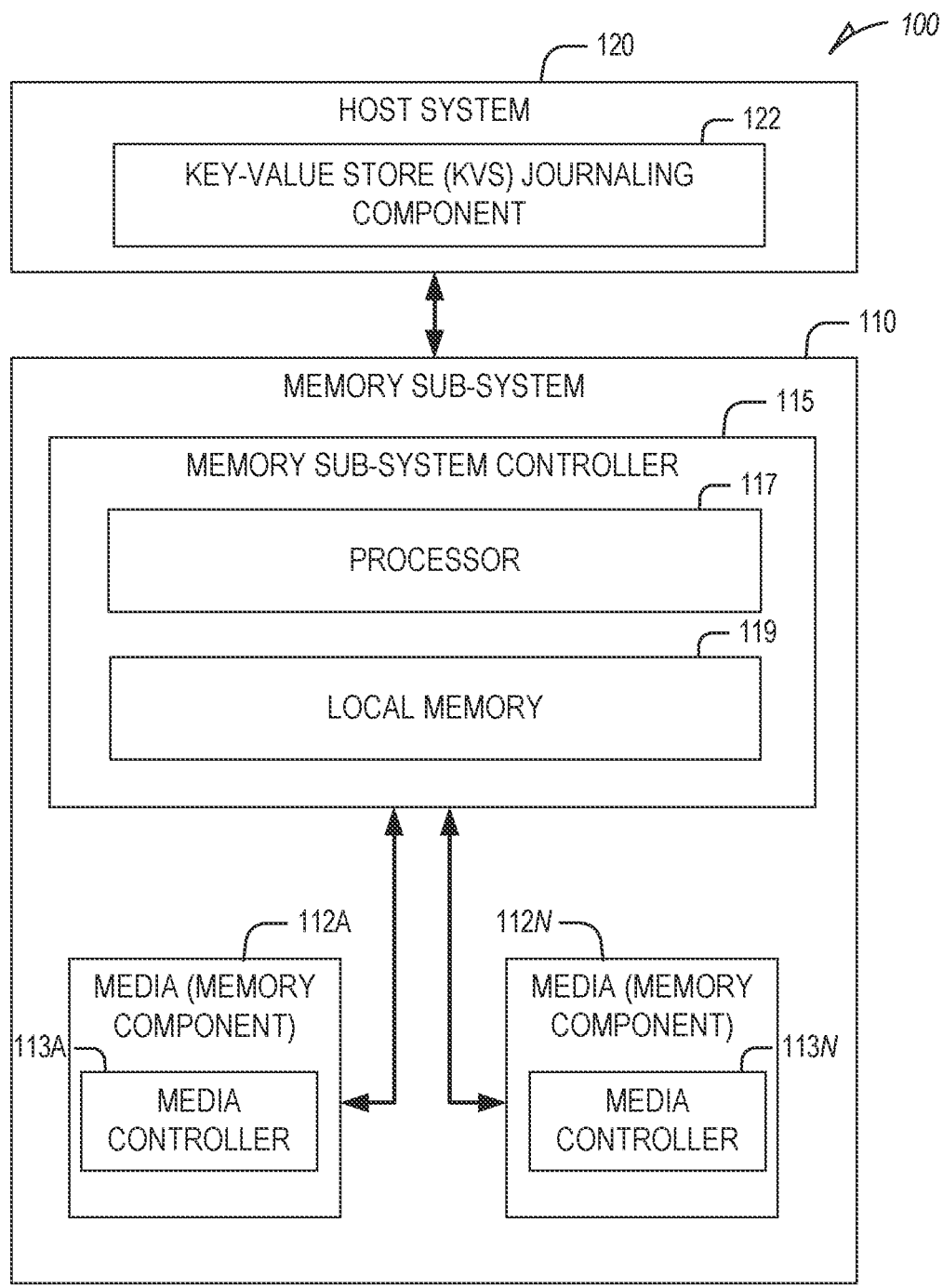
FIG. 1 is a block diagram illustrating an example computing environment including a memory sub-system, in accordance with some embodiments of the present disclosure.

Aspects of the present disclosure are directed to a key-value store (KVS) that uses journaling with storage of data (e.g., key data or value data of a key-value pair) in different types of data storage objects (e.g., data storage formats) selected based on one or more criteria. A memory sub-system is also hereinafter referred to as a "memory device."

An example of a memory sub-system is a storage system, such as a SSD, a Non-Volatile Dual Interface Memory Module (NVDIMM), or 3D XPoint memory. In some embodiments, the memory sub-system is a hybrid memory/storage sub-system. In general, a host system can utilize a memory sub-system that includes one or more memory components. The host system can provide data (e.g., via write requests) to be stored at the memory sub-system and can request data to be retrieved (e.g., via read requests) from the memory sub-system.

A memory sub-system can include multiple memory components that can store data from the host system. The memory sub-system can further include a memory sub-system controller that can communicate with each of the memory components to perform operations such as reading data, writing data, or erasing data at the memory components in response to requests received from the host system. Any one or more of the memory components of the memory sub-system may include a media controller to manage memory cells of the memory component, communicate with the memory sub-system controller, and execute memory requests (e.g., read or write) received from the memory sub-system controller.

In some applications, such as database storage and volume data storage (e.g., cloud storage), key-value data structures are used to store data on data storage media, such as a pool of data storage media (media pool) implemented by one or more memory devices and presented as a single logical data storage volume comprising one or more media data blocks (media blocks). A key-value store (KVS) can comprise one or more key-value data structures to store and search for key-value pairs. The key-value data structures can permit efficient searches of stored data of key-value pairs, permit efficient storage of sparse data, or permit efficient storage of searchable data. Generally, key-value data structures accept a key-value pair for storage and are configured to respond to queries for a value based on a key. Key-value data structures may comprise such structures as tree data structures, examples of which include log-structured merge tree (LSM tree) and a key-value store (KVS) tree (also referred to herein as a key-value store tree data structure or KVS tree data structure).

Aspects of the present disclosure provide various embodiments for a key-value store (KVS) that uses journaling with storage of data key data or value data of a key-value pair) in different types of data storage objects (e.g., data storage formats) selected based on one or more criteria. Traditionally, a storage stack, such as an enterprise storage stack, may honor guaranteed data consistency and durability, which may be required by software applications that use the storage stack. For this to happen, a conventional storage stack periodically synchronizes its data content from volatile memory (e.g., random access memory (RAM)) to a non-volatile data storage medium (e.g., media pool), which can lead to frequent and sub-optimal input/output operations (IOs) based on varying data payload sizes ranging from a few to a large number of bytes. One conventional technique to handle data consistency and durability is a mechanism that implements "journaling," which can try to reduce the adverse impacts of sub-optimal data storage media IOs while guaranteeing consistency and durability. Unfortunately, "journaling" can cause writing the same data contents more than once onto persistent data storage media, which in turn can lead to increased write operations (e.g., write-amplification) and can further lead to inefficient utilization of input/output data bandwidth. For example, traditional data storage solutions that use journaling can involve writing the same data content more than once to the persistent data storage media, first to journal data storage space and subsequently to long-term data storage space (e.g., permanent data locations). For some embodiments, a journal data storage layer of the KVS uses a persistent registry for journaling data of key-value pairs, where the persistent registry may reside in the best available data storage medium in a pool of data storage media.

Various embodiments provide a key-value store (KVS) that uses journaling with storage of data (e.g., key data or value data of a key-value pair) in selective different data storage formats. By journaling with selective different data storage formats (e.g., adaptive data and metadata structures), some embodiments can avoid the need for writing (e.g., copying) data more than once to persistent data storage media without compromising the durability and consistency requirements (e.g., that meet the needs of software applications). In particular, some embodiments selectively use a unified data structure (e.g., adaptive or unified data formats, such as media blocks) or metadata structures (e.g., journal data storage objects, such as metadata logs) for storing key data or value data in a journal data storage layer (hereafter, journal layer) when one or more criteria are met. Little or no data transformation may be needed when the key data or the value data moves from the journal layer to a long-term data storage layer (hereafter, long-term layer). By using some embodiments, writing key data or value data more than once (e.g., first to a journal and subsequently to a long-term permanent data storage location) can be avoided, and this in turn can reduce write operations (e.g., reduce write-amplification) and improve data performance of the KVS. Example criteria for using a unified data structure, in lieu of a metadata structure, for storing key data or value data of a key-value pair can comprise, without limitation: a criterion that selects a key or a value of certain data size; and a criterion that selects a set of keys or values that (e.g., based on input/output data patterns observed in the past) lead to increased write operations. For instance, based on observed data patterns that indicate repetitive updates to a key, an embodiment may store the key data or the value data associated with the key to be selected for storage in the journal layer using a unified data structure.

According to some embodiments, a key-value store (KVS) that uses journaling comprises an in-memory data storage layer (hereafter, in-memory layer), an intermediate journal data storage layer (hereafter, journal layer), and a long-term storage data storage layer (hereafter, long-term layer). Each layer may be a logical layer implemented by software, hardware, or a combination of both. The in-memory layer may comprise one or more key-value data structures for temporary data storage of one or more key-value pairs on volatile memory, the journal layer may comprise one or more key-value data structures for journaling (on persistent data storage space of non-volatile memory) one or more key-value pairs from the in-memory layer, and the long-term layer may comprise one or more key-value data structures for long-term data storage (on persistent data storage space of non-volatile memory) of one or more key-value pairs from the journal layer.

For some embodiments, the in-memory layer operates as an in-memory node that stores a sequence of key-value sets (as described herein), the long-term layer comprises a key-value store (KVS) tree data structure (as described herein) that operates one or more persistent nodes, and the journal layer operates as an intermediate node that logically couples the in-memory node (of the journal layer) to the root node of the KVS tree data structure (of the long-term layer).

Through such an arrangement (e.g., storage stack), KVS operations that, result in key-value pairs (e.g., new key-value pair, a modified key-value pair, or deleted key-value pair) can initially enter the KVS through the top node of the in-memory layer, flow from the top node of the in-memory layer to the intermediate node of the journal layer (e.g., to facilitate consistency and durability for key-pair data stored in the in-memory layer), flow from the intermediate layer of the journal layer to the root node (of the KVS tree data structure) of the long-term layer (e.g., to facilitate eventual long-term data storage for key-pair data stored in the journal layer). Eventually, key-value pair data can flow from the root node of the KVS tree data structure to one or more child nodes of the KVS tree data structure. For some embodiments, the long-term layer comprises a plurality of heterogeneous KVS tree data structures (e.g., disjointed KVS tree data structure), where the plurality of KVS tree data structures form a key-value database (hereafter, KVDB). The KVDB may comprise a root node connected to a plurality of child nodes that each operates as a root node for a different heterogeneous KVS tree data structure. The root node can receive heterogeneous key-value pairs from the journal layer and flow down to their respective KVS tree data structure.

Depending on the embodiment, the in-memory layer may comprise a sequence of key-value sets (also referred to herein as kvsets), the journal layer may comprise a sequence of kvsets, and the long-term layer may comprise a sequence of kvsets. Each sequence of kvsets may be temporally ordered, where later key-value sets in the sequence can represent older key-value sets. Each kvset can comprise one or more key-value pairs, which permit values to be stored in the kvset with corresponding keys that reference the values. The key-value pairs within a given kvset may be key-sorted. Every key within a given kvset may be unique from the other keys in the kvset. Each kvset may be immutable once written, but the kvset may be deleted or some or all of the kvset's data contents may be added to a new kvset.

For some embodiments, each kvset of the in-memory layer comprises a tree data structure, such as a binary tree data structure, for storing one or more key-value pairs. An example binary tree data structure may include a bonsai tree data structure (also referred to herein as a bonsai data tree or bonsai tree), which may be balanced and may support RCU semantics. With a binary tree data structure, such as a bonsai data tree, the kvset of the in-memory layer may function as a container for put or delete operations of key-value pairs (e.g., based on requests from a software application), thereby facilitating storage of those key-value pairs, searchability of those key-value pairs (e.g., search in log time), and high concurrency of operations to the stored key-value pairs (e.g., with RCU semantics). By receiving and storing put or delete operations with respect to key-value pairs, the bonsai data tree can reflect mutations to key-value pairs over time.

For some embodiments, each kvset of the journal layer comprises journal data storage objects (e.g., metadata logs) or non-journal data objects (e.g., media blocks, such as key blocks or value blocks) for storing key data and value data for key-value pairs. Additionally, for some embodiments, a single journal data storage object stores a smaller amount of data than a single non-journal data object. As a result, non-journal data storage objects may be better suited for storage of larger chunks of data than journal data storage objects, and non-journal data storage objects may be less suited for transactions for storing small amount of data.

For some embodiments, the long-term layer comprises a KVS tree that comprises a set of nodes that each comprises a sequence of kvset. As used herein, a KVS tree comprises a tree data structure comprising nodes with connections between parent and child nodes based on a predetermined derivation of a key (e.g., rather than the content of the tree). Each node can comprise an ordered (e.g., temporally ordered) sequence of key-value sets (also referred to herein as kvsets). As noted herein, where temporally ordered, later key-value sets in the sequence can represent older key-value sets. The kvsets can comprise one or more key-value pairs, which permit values to be stored in the KVS tree with corresponding keys that reference the values. Accordingly, within a KVS tree, kvsets function as individual key and value stores organized in the nodes of the KVS tree. The key-value pairs within a given kvset may be key-sorted. Every key within a given kvset may be unique from the other keys in the kvset; however, keys within the KVS tree may not be unique (e.g., two different kvsets within a single node or in different nodes of the KVS tree may include the same key). Each kvset may be immutable once written to a node (e.g., once placed/stored in a node, a kvset does not change). Though a kvset within a node may be immutable, the kvset may be deleted, or some or all of the kvset's data contents may be added to a new kvset.

For some embodiments, each kvset stored in a KVS tree (of the long-term layer) comprises a key tree to store key entries of key-value pairs of the kvset, where a given key entry may comprise both a key and a reference to a value. A variety of data structures may be used to efficiently store and retrieve unique keys in the key tree (e.g., it may not even be a data tree), such as binary search trees, B-trees, etc. For example, the keys are stored in leaf nodes of the key tree, where a maximum key in any subtree of the key tree may be in a rightmost entry of a rightmost child, a rightmost edge of a first node of the key tree is linked to a sub-node of the key tree, and all keys in a subtree rooted at the sub-node of the key tree may be greater than all keys in the first node of the key tree.

For some embodiments, for a kvset stored in a KVS tree, key entries are stored in a set of key data blocks (also referred to as key blocks or kblocks), which can comprise a primary key block and zero or more extension key blocks. Members of the set of key blocks may correspond to media data blocks (media blocks) for a data storage medium implemented by a memory device, such as an SSD, hard disk drive, NVDIMM, 3D XPoint memory, etc. Each key block may comprise a header to identify it as a key block, and a primary key block of a kvset may comprise a list of media block identifications for the one or more extension key blocks of the kvset.

A primary key block may comprise a header to a key tree of the kvset. The header may comprise a number of values to assist or facilitate interactions with the keys, or kvset. For example, the primary key block, or header stored therein, may comprise a copy of a lowest key in a key tree of the kvset, or a copy of a highest key in a key tree of the kvset. The primary key block may comprise a list of media block identifications for a key tree of the kvset, Additionally, the primary key block may comprise a bloom filter header for a bloom filter of the kvset, and the primary key block may comprise a list of media block identifications for a bloom filter of the kvset.

For some embodiments, for a kvset stored in a KVS tree, values are stored in a set of value data blocks (also referred to herein as value blocks or vblocks). Each particular value block in a KVS tree may have a data generation number associated with it that indicates a sequence order at which the particular value block was initially generated for the KVS tree. In this way, the data generation number of a particular value block can serve as a time stamp for when the particular value block is initially generated. For instance, data generation numbers may start at a value of "1" for the first value block generated and added to (e.g., a kvset of) a root node of the KVS tree, and the second value block generated and added to (e.g., a kvset of) the root node of the KVS tree would have a data generation number of "2." The data generation number increases with each new value block that is generated and added to the KVS tree through the root node.

Members of the set of value blocks may correspond to media data blocks (media blocks) for a data storage medium implemented by a memory device, which as noted herein can comprise an SSD, hard disk drive, NVDIMM, 3D XPoint memory, etc. Each value block may comprise a header to identify it as a value block. A value block may comprise a storage section to one or more values without separation between, where bits of a first value can run into bits of a second value on the data storage medium without a guard, container, or other delimiter between them. For various embodiments, a primary key block of a kvset comprises a list of media block identifications for value blocks in the set of value blocks for the kvset. In this way, a primary key block can manage storage references to value blocks within a kvset.

For some embodiments, a data marker associated with a key (hereafter, referred to as a tombstone) is used to indicate that the value corresponding to the key has been deleted, A tombstone may reside in the key entry in association with a key, and no value block space may be consumed for the key-value pair. According to some embodiments, the tombstone marks the deletion of the value associated with the key while avoiding the possibly expensive operation of purging the value from a KVS tree. For some embodiments, when a tombstone is encountered during a temporally ordered search of a KVS tree for a given key, a search process knows that a value corresponding to the given key has been deleted, even if an expired version of the key-value pair associated with that given key resides at a lower (e.g., older) location within the KVS tree.

For some embodiments, the primary key block includes a set of metrics for the kvset. For example, the set of metrics may comprise one or more of the following: a total number of keys stored in the kvset, or a number of keys with tombstone values stored in the kvset; a sum of all key lengths for keys stored in the kvset; a sum of all value lengths for keys stored in the kvset. The last two metrics may provide at least an approximate (if not exact) amount of storage consumed by the kvset. The set of metrics may also comprise, for example, an amount of unreferenced data in value-blocks (e.g., unreferenced values) of the kvset. This last metric can provide an estimate of the space that may be reclaimed in a maintenance operation (e.g., garbage collection operation performed on the KVS tree).

Though various embodiments are described herein with respect to storing value data of a key-value pair in different data storage objects that is selected based on one or more criteria, depending on the embodiment, this concept can also be applied with respect to key data of the key-value pair as well.

Disclosed herein are some examples of systems that perform operations relating to a key-value store using journaling with selective data storage format as described herein.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or other such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112, to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components, An example of non-volatile memory components includes a negative-and (NAND)-type flash memory, Each of the memory components 112A to 112N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller media controller 113A and media controller 113N)) to manage the memory cells of the memory component, to communicate with the memory sub-system controller 115, and to execute memory requests (e.g., read or write) received from the memory sub-system controller 115.

The host system 120 includes a key-value store (KVS) journaling component 122 that enables or otherwise facilitates a KVS in the example computing environment to use journaling with storage of data (e.g., key data or value data of a key-value pair) in different data storage formats selected based on one or more criteria. Depending on some embodiments, an in-memory layer as described herein may be implemented on the host system 120 (e.g., volatile memory on the host system 120, such as the local memory 119), and both a journal layer and a long-term layer as described herein may be implemented on the memory sub-system 110.

For some embodiments, the journal layer on the memory sub-system 110 receives a set of key-value pairs from the in-memory layer, which may be in response to the satisfaction of one or more various conditions evaluated on the host system 120. For instance, a condition may comprise, without limitation, a client request on the host system 120 (e.g., request from a software application on the host system 120) to flush or synchronize key-value pair to the journal layer, a time threshold (e.g., the host system 120 determines a predetermined time interval, such as 50 milliseconds, has been reached), or a data size threshold (e.g., the host system 120 determines that the amount of key-value pair data in the in-memory layer reaches or exceeds a data size threshold). For some embodiments, the time threshold (e.g., of 50 milliseconds) implements consistency and durability requirements for key-pair data stored on the in-memory layer (e.g., the volatile memory thereof), thereby minimizing or avoiding data loss in the event of unexpected power loss. Based on the frequency (e.g., predetermined time interval) at which key-value pair data is moved (e.g., flushed) from the in-memory layer to the journal layer, data flowing from the in-memory layer may be at a small granularity that, if written directly to the long-term layer without the journal layer, would result in increased write operations on the long-term layer and reduced searchability of key-value pairs on the long-term layer. The key-value pairs being received may comprise one or more key-value pairs from a kvset stored on the in-memory layer. For instance, the kvset providing the set of key-value pairs may comprise one or more of the oldest kvsets in a sequence of kvsets stored in the in-memory layer. As described herein, a kvset of the in-memory layer may comprise a tree data structure, such as a bonsai data tree, that facilitates storage and search of key-value pairs in the in-memory layer.

After receiving the key-value pairs from the in-memory layer, the KVS journaling component 122 can store key data, for a particular key from a particular key-value pair in the set of key-value pairs, in a first journal data storage object on a journal data storage space provided by the set of memory components 112A and 112N. For some embodiments, the first journal data storage object comprises a journal metadata log (also referred to herein as metadata log), which may comprise a metadata container that stores a state transaction metadata state providing a snapshot of the KVS) and one or more mutation transactions. The journal data storage space may be provided by data storage media (e.g., media pool) implemented by the set of memory components 112A and 112N, represent a persistent registry, and may reside on a best available data storage media in a media pool.

Additionally, after receiving the key-value pairs from the in-memory layer, the KVS journaling component 122 can determine whether a particular value, associated with a particular key from a particular key-value pair in the set of key-value pairs, meets a non-journal data storage object criterion. Example non-journal data storage object criteria can comprise, without limitation, the particular value exceeding a value data size (e.g., capture values that exceed a certain data size), the particular key (associated with the particular value) matching a target key that is associated with a historic write pattern (e.g., historic write pattern indicating that a number of write operations for the target key has exceeded a write threshold), or the particular value matching a target value that is associated with a historic write pattern (e.g., historic write pattern indicating that a number of write operations for the target value has exceeded a write threshold).

Based on determining whether the particular value meets the non-journal data storage object criterion, the KVS journaling component 122 can store value data, for the particular value, in at least one of a non-journal data storage object on the journal data storage space or a second journal data storage object on the journal data storage space. For some embodiments, the non-journal data storage object comprises a media block, used by data storage media (e.g., media pool) implemented by the set of memory components 112A and 112N, to store data. Depending on the embodiment, the non-journal data storage object comprises a value block, which may comprise a media block configured or suited for storing one or more values. For some embodiments, the second journal data storage object comprises a metadata log. For some embodiments, in response to determining that the particular value meets a non-journal data storage object criterion, the KVS journaling component 122 stores value data (of the particular value) in the non-journal data storage object (e.g., in a value block) on the journal data storage space. Additionally, for some embodiments, in response to determining that the particular value does not meet a non-journal data storage object criterion, the KVS journaling component 122 stores value data (of the particular value) in a (second) journal data storage object (e.g., metadata log) on the journal data storage space.

Eventually, the KVS journaling component 122 can determine whether a condition, to move the key data and the value data from the journal data storage space, is satisfied. In response to determining that the condition is satisfied, the KVS journaling component 122 can move the key data and the value data from the journal data storage space to a new kvset added to a node of a key-value store (KVS) tree data structure stored on the long-term data storage space. In moving the key data and value data from the journal data storage space to the new kvset, some embodiments can facilitate long-term bulk persistent data storage of the key data and the value data. According to some embodiments, the new kvset added to the KVS tree data structure comprises a first set of non-journal data storage objects for storing one or more keys and a second set of non-journal data storage objects for storing one or more values. Additionally, for some embodiments, the new kvset may be added to (e.g., to the beginning of) a sequence of kvsets stored by a root node of the KVS tree data structure. Depending on the embodiment, the first set of non-journal data storage objects may comprise a set of key blocks, each of which comprises a media block configured or suited for storing one or more keys. Additionally, depending on the embodiment, the second set of non-journal data storage objects comprises a set of value blocks, each of which comprises a media block configured or suited for storing one or more values.

The KVS journaling component 122 can move the key data, from the journal data storage space to the KVS tree data structure, by writing the key data, from the first journal data storage object on the journal data storage space, to one or more non-journal data storage objects of the KVS tree data structure. As noted herein, the new kvset of the root node of the KVS tree data structure may comprise a first set of non-journal data storage objects for storing keys of key-value pairs and, as such, writing the key data from the first journal data storage object on the journal data storage space to the KVS tree data structure may comprise writing the key data to one or more non-journal data storage objects (e.g., key blocks) in the first set of non-journal data storage objects.

As noted herein, in response to determining that the particular value meets a non-journal data storage object criterion, the KVS journaling component 122 may store value data (of the particular value) in the non-journal data storage object (e.g., in a value block) on the journal data storage space. Accordingly, when the KVS journaling component 122 moves the value data from the journal data storage space to the KVS tree data structure on the long term data storage space, the KVS journaling component 122 can move the value data by changing association (e.g., assigning ownership) of the non-journal data object from the journal data storage space to the KVS tree data structure (e.g., the new kvset added to the root node) on the long term data storage space. In doing so, some embodiments can help avoid a write operation (and reduce write amplification) to write the value data from one data object format (e.g., journal data storage object) to another data object (e.g., non-journal data storage object supported (e.g., used, compatible or accepted) by the long-term data storage space). As noted herein, the new kvset of the root node of the KVS tree data structure may comprise a second set of non-journal data storage objects for storing values of key-value pairs and, as such, changing association of the non-journal data object from the journal data storage space to the KVS tree data structure may comprise changing the association of the non-journal data object to the second set of non-journal data storage objects of the new kvset.

Alternatively, as noted herein, in response to determining that the particular value does not meet a non-journal data storage object criterion, the KVS journaling component 122 may store value data (of the particular value) in a (second) journal data storage object (e.g., metadata log) on the journal data storage space. Accordingly, when the KVS journaling component 122 moves the value data from the journal data storage space to the KVS tree data structure on the long term data storage space, the KVS journaling component 122 can move the value data by writing the value data, from the second journal data storage object on the journal data storage space, to one or more non-journal data storage objects of the KVS tree data structure. As noted herein, the new kvset of the root node of the KVS tree data structure may comprise a second set of non-journal data storage objects for storing values of key-value pairs and, as such, writing the value data from the second journal data storage object on the journal data storage space to the KVS tree data structure may comprise writing the value data to one or more non-journal data storage objects (e.g., value blocks) in the second set of non-journal data storage objects.

Depending on the embodiment, operations described herein with respect to the KVS journaling component 122 may be performed on the host system 120, on the memory sub-system 110, or some combination of both. For instance, depending on the embodiment, the KVS journaling component 122 may comprise logic (e.g., a set of machine instructions, such as firmware) or one or more components that causes the memory sub-system 110 (e.g., the memory sub-system controller 115) to perform operations described herein with respect to the KVS journaling component 122. The KVS journaling component 122 may comprise a tangible unit capable of performing operations described herein. Further details with regards to the operations of the KVS journaling component 122 are described below.

Figure 2:
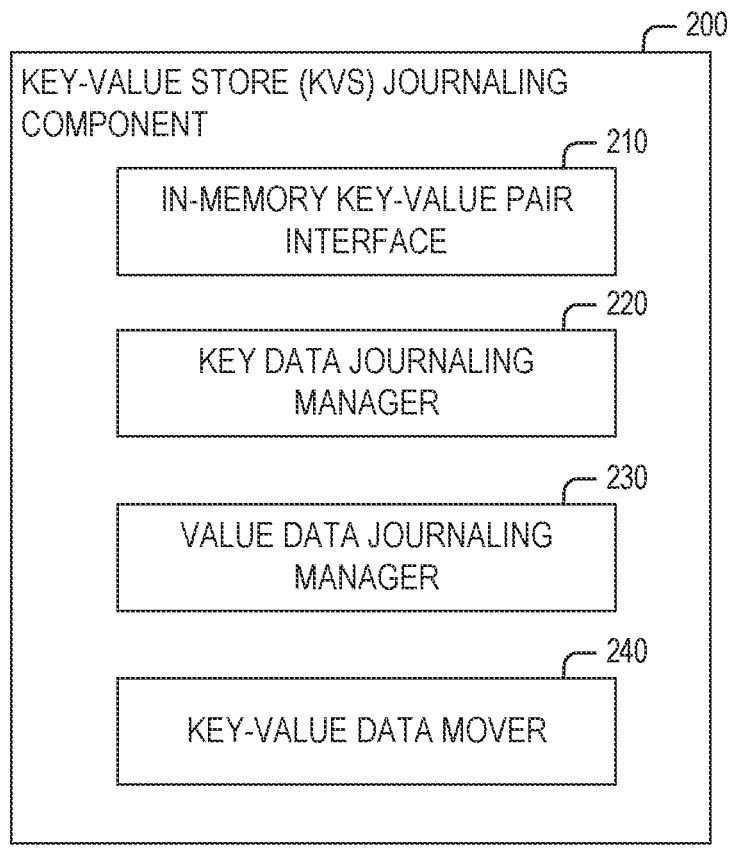
FIG. 2 is a block diagram of an example key-value store (KVS) journaling component, in accordance with some implementations of the present disclosure.

FIG. 2 is a block diagram of an example key-value store (KVS) journaling component 200 (hereafter, the KVS journaling component 200), in accordance with some implementations of the present disclosure. As illustrated, the KVS journaling component 200 comprises an in-memory key-value pair interface 210, a key data journaling manager 220, a value data journaling manager 230, and a key-value data mover 240. For some embodiments, the KVS journaling component 200 may differ in components or arrangement (e.g., fewer or more components) than what is illustrated in FIG. 2.

The in-memory key-value pair interface 210 receives a set of key-value pairs (e.g., from one or more kvsets stored on an in-memory layer), which may be sent to the in-memory key-value pair interface 210 in response to the satisfaction of one or more various conditions evaluated on a host system. Example conditions may comprise, without limitation, a client request on a host system to flush or synchronize key-value pairs to the journal layer, a time threshold, or a data size threshold.

The key data journaling manager 220 stores key data for a particular key, of a particular key-value pair in the set of key-value pairs, in a first, journal data storage object on the journal data storage space. For example, the first journal data storage object may comprise a journal metadata log, which may comprise a metadata container that stores a state transaction and one or more mutation transactions.

The value data journaling manager 230 determines whether a particular value, of the particular key-value pair, meets a non-journal data storage object criterion. Example non-journal data storage object criteria, without limitation: criterion that selects a key or a value of certain data size, and criterion that selects a set of keys or values that (e.g., based on input/output data patterns observed in the past) lead to increased write-operations. For instance, based on observed data patterns that indicate repetitive updates to a key, an embodiment may store the key data or the value data associated with the key to be selected for storage in the journal layer using a non-journal data storage object. The value data journaling manager 230 stores value data for the particular value, in at least one of a non-journal data storage object on the journal data storage space or a second journal data storage object on the journal data storage space, based on the value data journaling manager 230 determining whether the particular value meets the non-journal data storage object criterion.

The key-value data mover 240 moves the key data and the value data from the journal data storage space to a new key-value set added to a node of a key-value store tree data structure, the key-value store tree being stored on a long-term data storage space provided by the set of memory components, and the new key-value set comprising a first set of non-journal data storage objects for storing one or more keys and a second set of non-journal data storage objects for storing one or more values. Where the value data journaling manager 230 stores the value data (of the particular value)

in the non-journal data storage object (e.g., in a value block) on the journal data storage space, the key-value data mover 240 moves the value data by changing association (e.g., assigning ownership) of the non-journal data object from the journal data storage space to the KVS tree data structure (e.g., the new kvset added to the root node) on the long term data storage space. Where the value data journaling manager 230 stores the value data (of the particular value) in a (second) journal data storage object (e.g., metadata log) on the journal data storage space, the key-value data mover 240 moves the value data by writing the value data, from the second journal data storage object on the journal data storage space, to one or more non-journal data storage objects of the KVS tree data structure.

Figure 3:
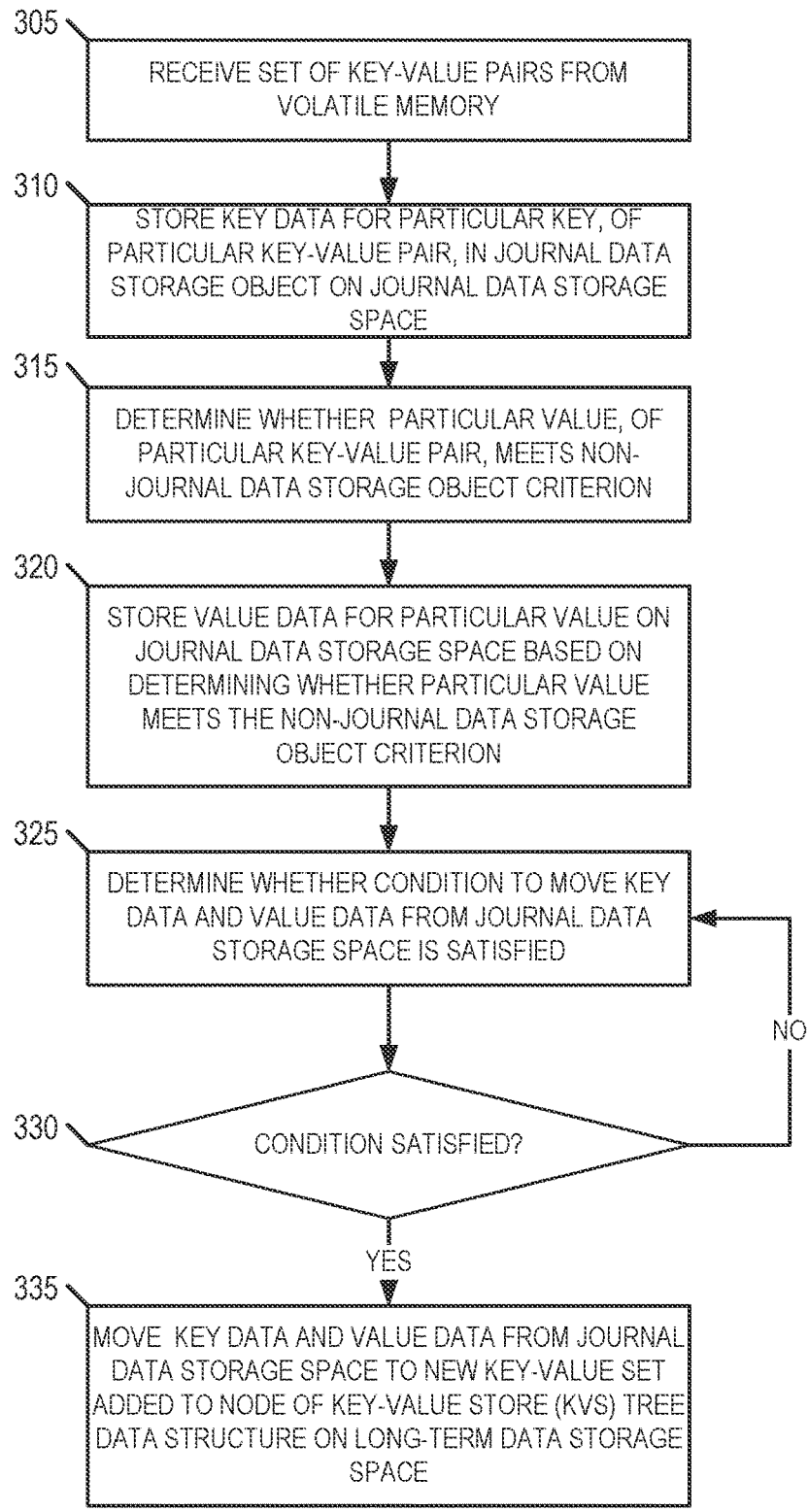
FIGS. 3 and 4 are flow diagrams of example methods for a KVS that uses journaling, in accordance with some implementations of the present disclosure.
Figure 4:
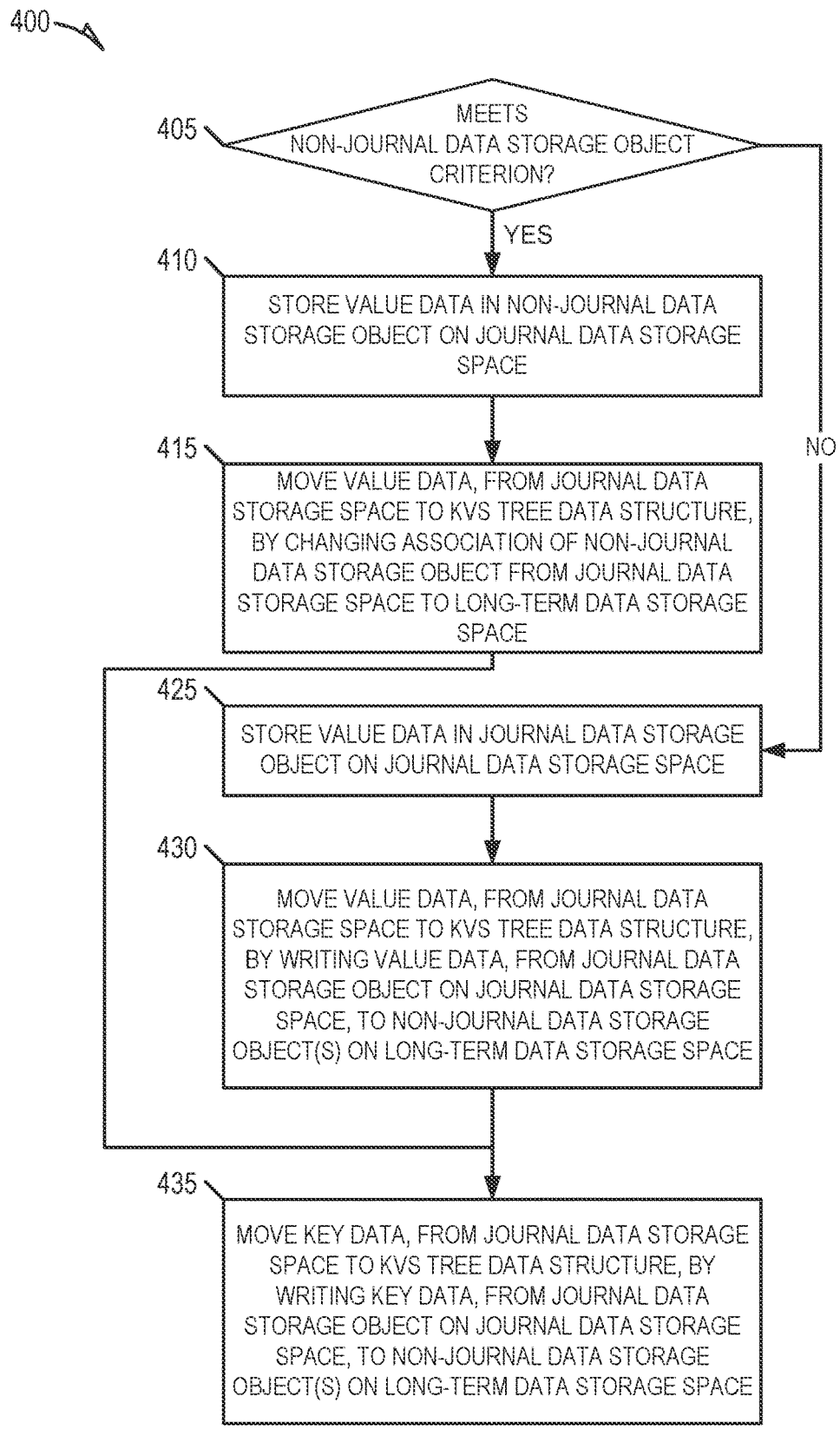

FIGS. 3 and 4 are flow diagrams of example methods for a key-value store (KVS) that uses journaling, in accordance with some implementations of the present disclosure. Any of methods 300, 400 of FIGS. 3 and 4 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, one or more methods 300, 400 of FIGS. 3 and 4 are performed by the host system 120 of FIG. 1. In these embodiments, the methods 300, 400 may be performed, at least in part, by the key-value store journaling component 122. Alternatively, one or more methods of FIGS. 3 and 4 are performed by the memory sub-system 110 of FIG. 1 (e.g., the processor 117 of the memory sub-system controller 115). Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Operations of the methods 300, 400 of FIGS. 3 and 4 may be concurrently performed with respect to the KVS store.

Referring now to the method 300 of FIG. 3, at operation 305, a processing device of a host system (e.g., 120) receives (or otherwise retrieves) a set of key-value pairs from volatile memory of the host system, which may be in response to the satisfaction of one or more various conditions evaluated on the host system. As noted herein, the key-value pairs being received may comprise one or more key-value pairs from a kvset stored on the in-memory layer. For instance, the kvset providing the set of key-value pairs may comprise one or more of the oldest kvsets in a sequence of kvsets stored in the in-memory layer. The kvset of the in-memory layer may comprise a tree data structure, such as a bonsai data tree, that facilitates storage and search of key-value pairs in the in-memory layer.

At operation 310, the processing device of the host system stores key data for a particular key, of a particular key-value pair in the set of key-value pairs received at operation 305, in a first journal data storage object e.g., metadata log) on a journal data storage space provided (e.g., on data storage media implemented) by a set of memory components.

At operation 315, the processing device of the host system determines whether a particular value, of the particular key-value pair (same as that of the particular key), meets a non-journal data storage object criterion. As noted herein, example non-journal data storage object criteria can comprise, without limitation, the particular value exceeding a value data size (e.g., capture values that exceed a certain data size), the particular key (associated with the particular value) matching a target key that is associated with a historic write pattern (e.g., historic write pattern indicating that a number of write operations for the target key has exceeded a write threshold), or the particular value matching a target value that is associated with a historic write pattern (e.g., historic write pattern indicating that a number of write operations for the target value has exceeded a write threshold).

At operation 320, the processing device of the host system stores value data for the particular value, in at least one of a non-journal data storage object (e.g., value block) on the journal data storage space or a second journal data storage object (e.g., metadata log) on the journal data storage space, based on the determining whether the particular value meets the non-journal data storage object criterion. In particular, in response to determining that the particular value meets the non-journal data storage object criterion, the processing device of the host system can store the value data in the non-journal data storage object on the journal data storage space and, in response to determining otherwise, the processing device of the host system can store the value data in the second journal data storage object on the journal data storage space.

At operation 325, the processing device of the host system determines whether a condition, to move the key data and the value data from the journal data storage space, is satisfied. At operation 330, if the processing device of the host system determines that a condition, to move the key data and the value data from the journal data storage space, is satisfied, the method 300 proceeds to operation 335; otherwise the method 300 returns to operation 325.

At operation 335, the processing device of the host system moves the key data and the value data, from the journal data storage space, to a new kvset that is added to a node of a key-value store tree data structure stored on a long-term data storage space provided (e.g., on data storage media implemented) by the set of memory components. According to some embodiments, the new kvset comprises a first set of non-journal data storage objects for storing one or more keys and a second set of non-journal data storage objects for storing one or more values. For some embodiments, moving the key data and the value data, from the journal data storage space to long-term data storage space, comprises the processing device of the host system performing the method 400 of FIG. 4.

Referring now to the method 400 of FIG. 4, at operation 405, if the processing device of the host system determines that a particular value (from the particular key-value pair) meets a non-journal data storage object criterion, the method 400 proceeds to operation 410, otherwise the method 400 proceeds to operation 425.

At operation 410, the processing device of the host system stores the value data in a non-journal data storage object on a journal data storage space. Subsequently, at operation 415, the processing device of the host system moves the value data, from the journal data storage space to the long-term data storage space, by changing association (e.g., ownership) of the non-journal data storage object from the journal data storage space to the long-term data storage space, such as to the second set of non-journal data storage objects (for storing values of key-value pairs) of the new kvset of the KVS tree data structure.

At operation 425, the processing device of the host system stores the value data in a journal data storage object on the journal data storage space. Subsequently, at operation 430, the processing device of the host system moves the value data, from the journal data storage space to the long-term data storage space, by writing the value data, from the second journal data storage object on the journal data storage space, to one or more non-journal data storage objects on the long-term data store space, such as non-journal data storage objects in the second set of non-journal data storage objects (for storing values of key-value pairs) of the new kvset of the KVS tree data structure.

From operation 415 or operation 435, the method 400 proceeds to operation 435, where the processing device of the host system moves the key data, from the first journal data storage object on the journal data storage space, to one or more non-journal data storage objects on the long-term data store space, such as non-journal data storage objects in the first set of non-journal data storage objects (for storing keys of key-value pairs) of the new kvset of the KVS tree data structure.

Figure 5:
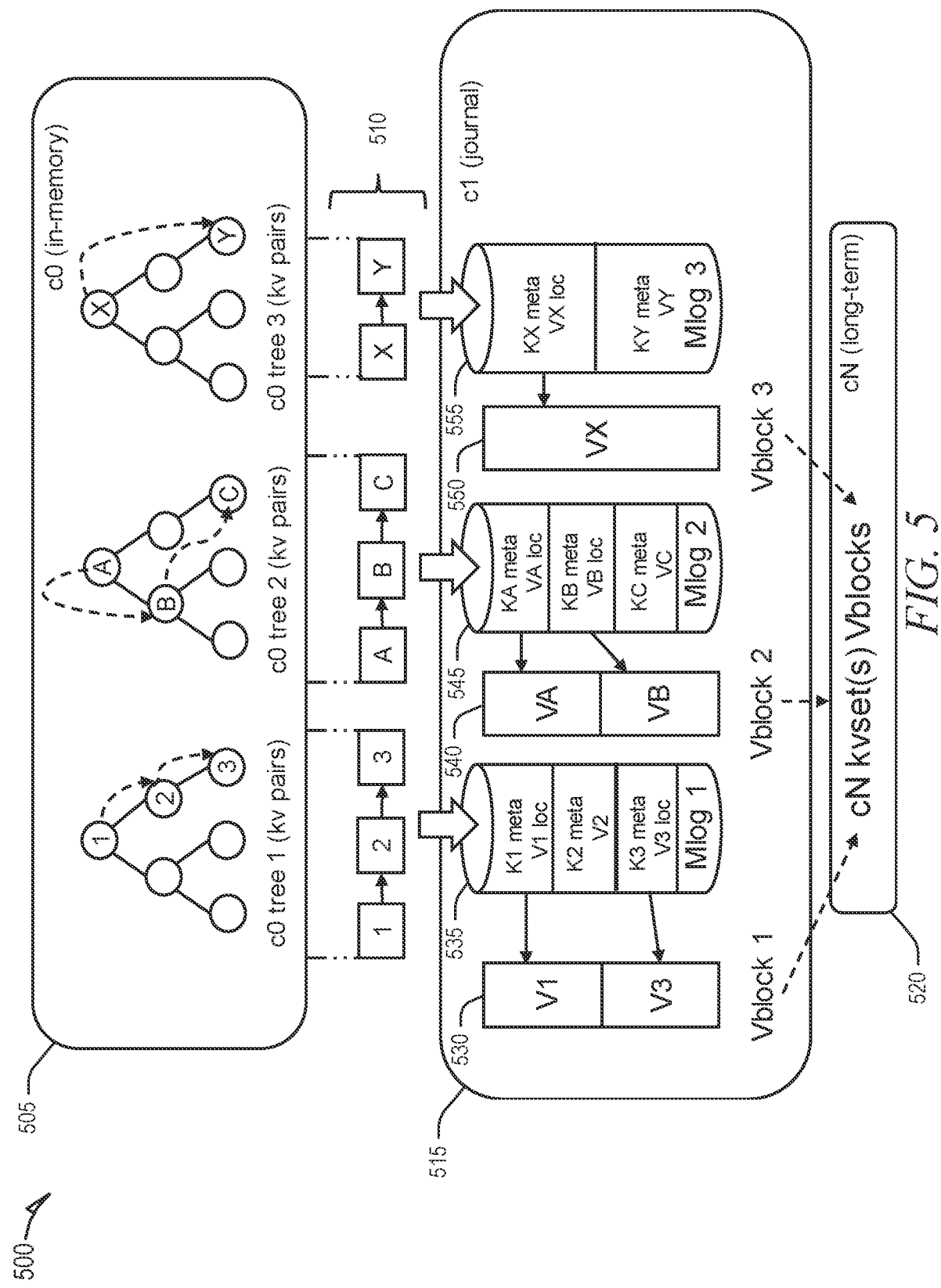
FIGS. 5 and 6 are block diagrams illustrating operation of an example KVS that use journaling, in accordance with some implementations of the present disclosure.
Figure 6:
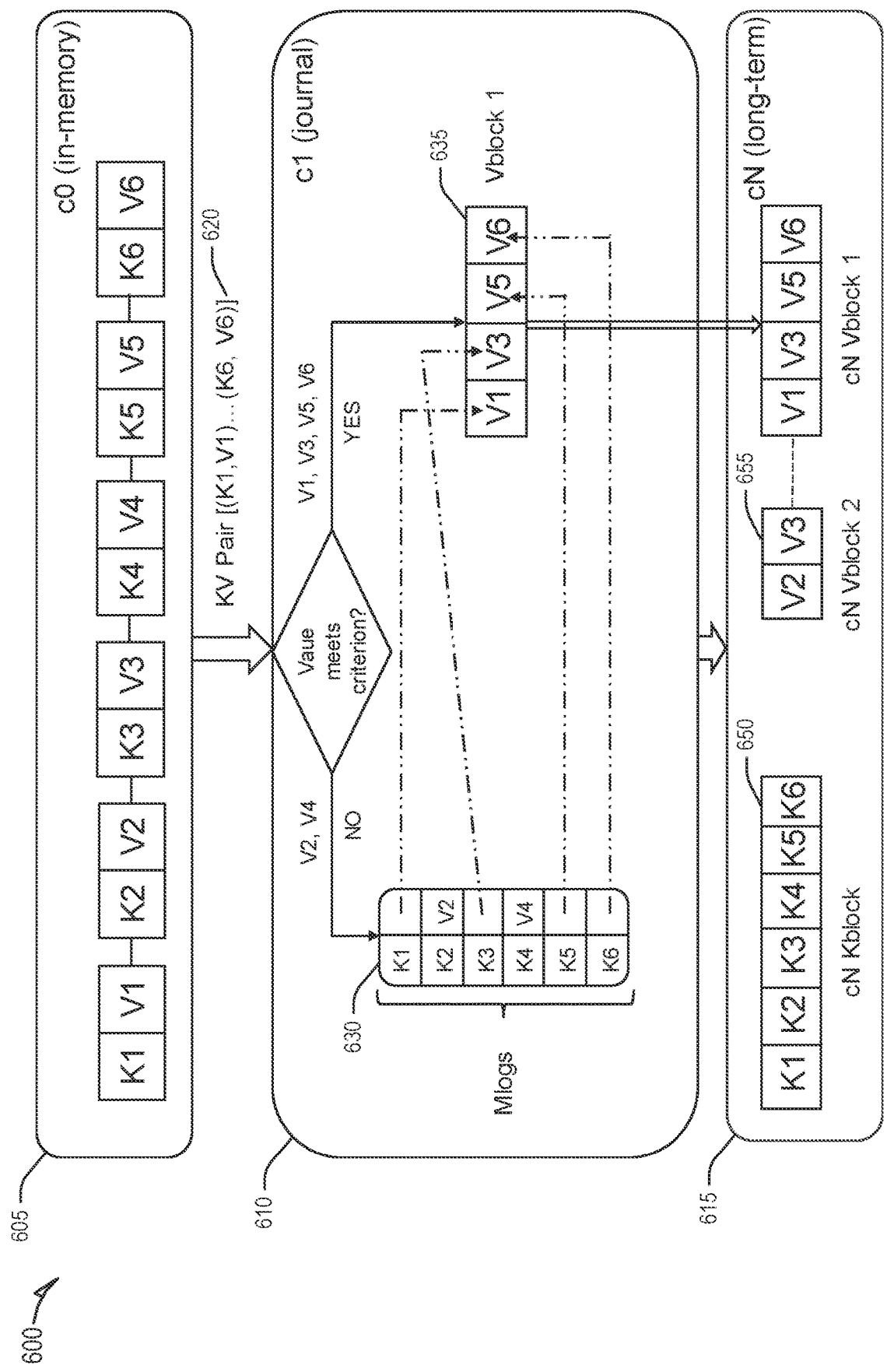

FIGS. 5 and 6 are block diagrams illustrating operation of example key-value stores (KVSs) that use journaling, in accordance with some implementations of the present disclosure. Referring now to FIG. 5, as shown, a KVS 500 comprises an in-memory layer 505 (also referred to herein as node c0 of the KVS 500), a journal layer 515 (also referred to herein as node c1 of the KVS 500), and a long-term layer 520 (also referred to herein as nodes cN of the KVS 500). Each stored kvset on the in-memory layer 505 comprises a binary tree data structure e.g., bonsai data tree) for storing key-value pairs (e.g., entered as put and delete operations that mutate key-value pairs). As illustrated, data tree 1 of c0) stores mutations to key-value pairs of keys 1, 2, 3 (K1, K2, and K3 respectively); data tree 2 of c0 stores mutations to key-value pairs of keys A, B, C (KA, KB, and KC respectively); and data tree 3 of c0 stores mutations to key-value pairs of key X and Y (KX and KY respectively).

Eventually, key and value data 510 of the key-value pair stored by (binary data tree structures of) the in-memory layer 505 are moved (e.g., committed) to the journal layer 515 for durability and persistence. The move may be in response, for example, to satisfaction of a condition (e.g., durability interval, such as 50 milliseconds) to move key data and value data 510 of key-value pairs from the in-memory layer 505 to the journal layer 515. When moving the key and value data of key-value pairs from the in-memory layer 505 to the journal layer 515, each of the keys (K1, K2, K3, KA, KB, KC, KX, KY) is stored on the journal layer 515 in journal data objects, such as metadata logs. In particular, as shown, each of the keys K1, K2, K3 is stored in metadata log 1 (Mlog1) (535), each of the keys KA, KB, KC is stored in metadata log 2 (Mlog2) (545), and each of keys KX, KY is stored in metadata log 3 (Mlog3) (555).

Additionally, each of the values V1, V2, V3, VA, VB, VC, VX, VY (corresponding to keys K1, K2, K3, KA, KB, KC, KX, KY respectively) is stored on the journal layer 515 in non-journal data objects (e.g., media blocks, such as value blocks) or journal data objects metadata logs) based on a non-journal data storage object criterion (as described herein). In particular, as shown, value V2 is stored to Mlog1 (535) on the journal layer 515 based on a non-journal data storage object criterion (e.g., value V2 meets the criterion); value VC is stored to Mlog2 (545) on the journal layer 515 based on a non-journal data storage object criterion (e.g., value VC meets the criterion); and value VY is stored to Mlog3 (555) on the journal layer 515 based on a non-journal data storage object criterion (e.g., value VY meets the criterion). In contrast, each of values V1 and V3 are stored to value block 1 (vblock 1) (530) on the journal layer 515 based on a non-journal data storage object criterion (e.g., each of values V1 and V3 do not meet the criterion); each of values VA and VB is stored to value block 2 (vblock 2) (540) on the journal layer 515 based on a non-journal data storage object criterion (e.g., each of values VA and VB do not meet the criterion); and value VX is stored to value block 3 (vblock 3) (550) on the journal layer 515 based on a non-journal data storage object criterion (e.g., value VX does not meet the criterion). Accordingly, for the keys K1, K3, KA, KB, KX, the corresponding metadata logs 1, 2, 3 (535, 545, 555) comprise reference locations to value blocks storing the corresponding values V1, V3, VA, VB, VX, which were stored to value blocks based on a non-journal data storage object criterion. According to some embodiments, the non-journal data storage object used to store values on the journal layer 515 corresponds (e.g., is compatible with or similar to) to the type of data storage object used by the long-term layer 520 to store values.

As noted herein, this can enable some embodiments to avoid a write (e.g., copy) operation when moving value data from a non-journal data storage object on the journal layer 515 to the long-term layer 520, which can reduce write amplification and improved endurance. Accordingly, as illustrated in FIG. 5, when the key data and the value data is moved from the journal layer 515 to the long-term layer 520, ownership of the value blocks 1, 2, 3 (i.e., non-journal data storage objects) that store value data for values V1, V3, VA, VB, VX is moved from the journal layer 515 to be part of one or more kvsets (e.g., new kvsets) stored on the long-term layer 520. Though not shown, according to some embodiments, when the key data and the value data is moved from the journal layer 515 to the long-term layer 520, key data stored in metadata logs 1, 2, 3 (i.e., journal data storage objects) are written to one or more new key blocks of the one or more kvsets (e.g., the new kvsets) stored on the long-term layer 520, and the value data stored in metadata logs 1, 2, 3 are written to one or more new value blocks of the one or more kvsets (e.g., the new kvsets) stored on the long-term layer 520.

Referring now to FIG. 6, as shown, the KVS 600 comprises an in-memory layer 605 (also referred to herein as node c0 of the KVS 600), a journal layer 610 (also referred to herein as node c1 of the KVS 600), and a long-term layer 615 (also referred to herein as node cN of the KVS 600). As shown, key-value pairs 620 are received from the in-memory layer 605 by the journal layer 610. In response, the journal layer 610 stores all keys from the key-value pairs 620 to metadata logs (Mlogs) 630. For values of the key-value pairs 620 that do not meet a criterion (non-journal data storage object criterion), such as values V2 and V4, those values are stored to Mlogs 630 in association with their respective keys (e.g., keys K2 and K4 for values V2 and V4 respectively). For values of the key-value pairs 620 that do meet a criterion (non-journal data storage object criterion), such as values V1, V3, V5, V6, those values are stored to value block 1 (vblock 1) (635). Accordingly, with respect to keys K1, K3, K5, K6, Mlogs 630 store references to vblock 1 (635) that correspond to values V1, V3, V5, V6.

As shown, when key and value data for keys K1, K2, K3, K4, K5, K6 are moved from the journal layer 610 to the long-term layer 615, key data from Mlogs 630 are written to key block (kblock) (650) stored on the long-term layer 615, value data from Mlogs 630 are written to value block 2 (vblock 2) (655) stored on the long-term layer 615, and ownership of vblock 1 (635) is moved from the journal layer 610 to the long-term layer 615. As noted herein, for some embodiments, kblock 650, vblock 2 (655), and vblock 1

(635) are part of a new kvset being added (e.g., ingested) by a root node of a key-value store (KVS) tree data structure stored on the long-term layer 615.

Figure 7:
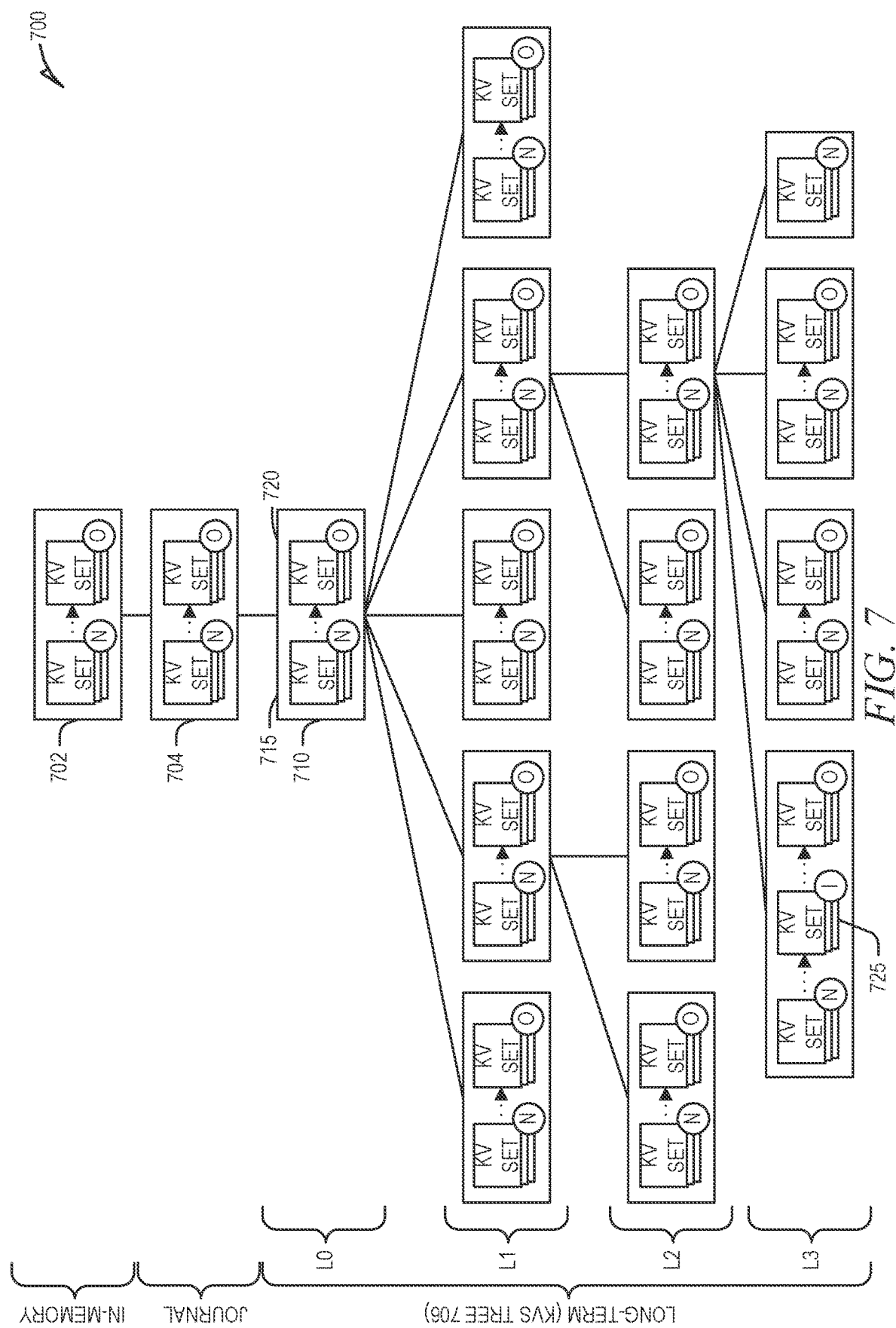
FIGS. 7 and 8 are block diagrams illustrating example KVSs that use journaling, in accordance with some implementations of the present disclosure.
Figure 8:
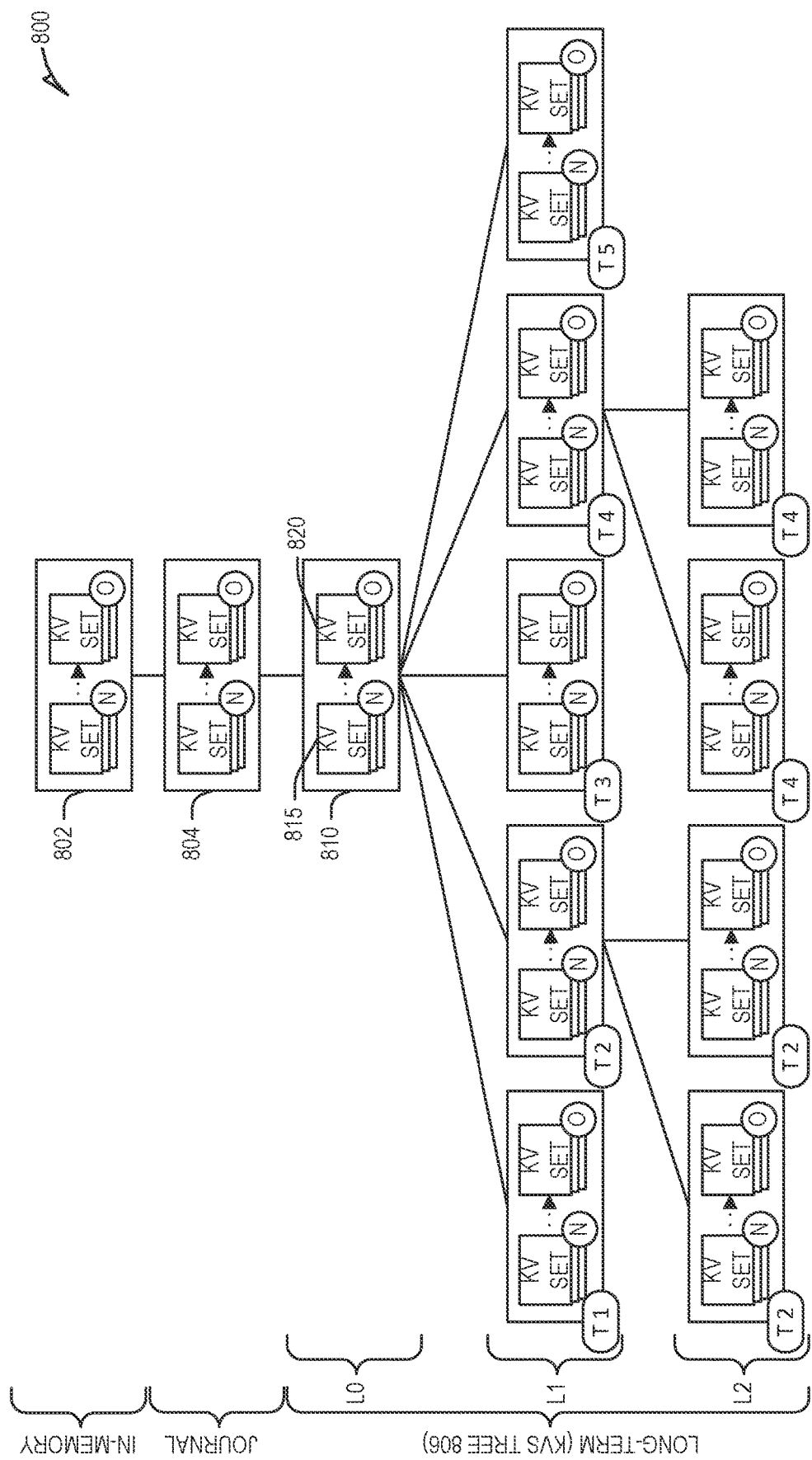

FIGS. 7 and 8 are block diagrams illustrating example key-value stores (KVSs) that use journaling, in accordance with some implementations of the present disclosure. Referring now to FIG. 7, an example KVS 700 as illustrated is organized as a tree, which includes an in-memory layer comprising first root node 702, a journal layer comprising second root node 704, and a long-term layer comprising a key-value store (KVS) tree data structure 706 (KVS tree 706), which comprises levels L0, L1, L2, L3 of nodes and which starts with third root node 710 in level L0 and flows down to multiple child nodes in levels L1, L2, L3 connected to third root node 710. According to various embodiments, the first root node 702 is stored on volatile memory (e.g., of a host system), the second root node 704 is stored on journal data storage space provided by persistent data storage media (e.g., implemented by a memory sub-system 110), and the KVS tree 706 and its corresponding nodes are stored on long-term data storage space (different from the journal data storage space) provided by the persistent data storage media.

With respect to the KVS tree 706, values are stored (e.g., in value blocks) in the KVS tree 706 with corresponding keys (e.g., in key blocks) that reference the values. Specifically, key-entries may be used to contain both the key and additional information, such as a reference to the value. Keys themselves may have a total ordering within the KVS tree 706 and, as such, keys may be sorted amongst each other. Keys may also be divided into sub-keys, where the sub-keys are non-overlapping portions of a key. For some embodiments, the total ordering of keys is based on comparing like sub-keys between multiple keys (e.g., a first sub-key of a key is compared to the first sub-key of another key). Additionally, for some embodiments, a key prefix comprises a beginning portion of a key. When used, a key prefix may be composed of one or more sub-keys.

The nodes of the KVS 700, such as node 710, each include one or more key-value sets (kvsets). For some embodiments, one or more nodes (such as the node 710) each comprises a temporally ordered sequence of kvsets. As illustrated, kvset 715 comprises an 'N' badge to indicate that it is the newest of the sequence while kvset 720 comprises an 'O' badge to indicate that it is the oldest of the sequence. Kvset 725 comprises an 'I' badge to indicate that it is intermediate in the sequence. These badges are used throughout to label kvsets; however, another badge (such as an 'X') denotes a specific kvset rather than its position in a sequence (e.g., new, intermediate, old, etc.), unless it is a tilde '~', in which case it is simply an anonymous kvset. As is explained in greater detail below, older kvsets (with older key blocks) occur lower in the KVS tree 706. Thus, pushing (e.g., spilling) kvsets down a tree-level, such as from L1 to L2, results in at least one new kvset, from a parent node, to be added to the newest position in a recipient child node of the parent node.

The KVS tree 706 comprises a determinative mapping for a key-value pair (stored by a key block and a value block) in a kvset of a given node the node 710) to any one child node of the given node (e.g., any one of the child nodes of the node 710, which are represented by all the nodes at L1). The determinative mapping of the KVS tree 706 can mean that, given a key, an external entity could trace a path through nodes of the KVS tree 706 to a key block and a value block (of a key-value pair) for the key without knowing the contents of the KVS nee 706. This, for example, is different than a B-tree, for example, where the contents of the tree will determine where a given key's value will fall in order to maintain the search-optimized structure of the tree. In contrast, the determinative mapping of the KVS tree 706 can provide a rule such that, for example, given a key, one may calculate the child node at L3 the key would map to even if the maximum tree-level (e.g., tree depth) is only at L1 at the moment. For some embodiments, the determinative mapping comprises a portion of a hash of a portion of the key. A sub-key may be hashed to arrive at a mapping set, and a portion of the mapping set may be used for any given level of the tree. Depending on the embodiment, the portion of the key may comprise the entire key.

For some embodiments, the hash comprises a multiple of non-overlapping portions including the portion of the hash. For instance, each of the multiple of non-overlapping portions may correspond to a level of the tree. The portion of the hash may be determined from the multiple of non-overlapping portions by a level of the node. Accordingly, a maximum number of child nodes for the node may be defined by a size of the portion of the hash, where the size of the portion of the hash may be a certain number of bits. For example, with respect to a hash of a key that results in eight bits, the eight bits may be divided into three sets comprising the first two bits, bits three through six, and bits seven and eight. Child nodes may be indexed based on the set of bits, such that child nodes at the first level (e.g., L1) have two bit names (based on bits one and two), child nodes on the second level (e.g., L2) have four-bit names (based on bits three through six), and child nodes on the third level (e.g., L3) have two bit names (based on bits seven and eight).

Referring now to FIG. 8, similar to the KVS 700 of FIG. 7, an example KVS 800 is organized as a tree, but supports heterogeneous key-value sets (kvsets). As shown, the KVS 800 includes an in-memory layer comprising first root node 802, a journal layer comprising second root node 804, and a long-term layer comprising a key-value store (KVS) tree data structure 806 (KVS tree 806), which comprises levels L0, L1, L2 of nodes and which starts with third root node 810 in level L0 and flows down to multiple child nodes in levels L1, L2 connected to third root node 810.

The KVS tree 806 comprises multiple KVS trees— designated as T1, T2, T3, and T4—that share the third root node 810 at a common base level (L0) and then are disjointed at subsequent levels L1 and L2). According to some embodiments, root nodes 802, 804, 810 of the KVS 800 can comprise heterogeneous kvset (kvsets that include entries from multiple KVS trees), while nodes at subsequent levels of the KVS 800 (e.g., levels L1 onward of the KVS tree 806) can comprise homogeneous kvsets (kvsets that include entries from only one KVS tree). In this way, the KVS tree 806 can implement a key-value database (KVDB) of a plurality of different KVS trees. In FIG. 8, to illustrate that subsequent level nodes belong to a single KVS tree, the nodes include a badge in the lower-left corner denoting their tree affiliation (e.g., T1 or T2).

According to some embodiments, the KVS 800 comprises a first determinative mapping of entries between level L0 to level L1 of the KVS tree 806, and a second determinative mapping of entries between subsequent levels (e.g., L1 to L2, L2 to L3, and so on). To facilitate a tree identifier (TID) use in the first determinative mapping (from level L0 to L1), entries in heterogeneous kvsets in one or more of root nodes 802, 804, 810 may comprise the TID as part of key or value entries. Homogeneous kvsets may omit the TID from entries. In this way, where used, the TID may be readily available, and where it is not used, space may be saved by omitting the TID from an entry.

Figure 9A:
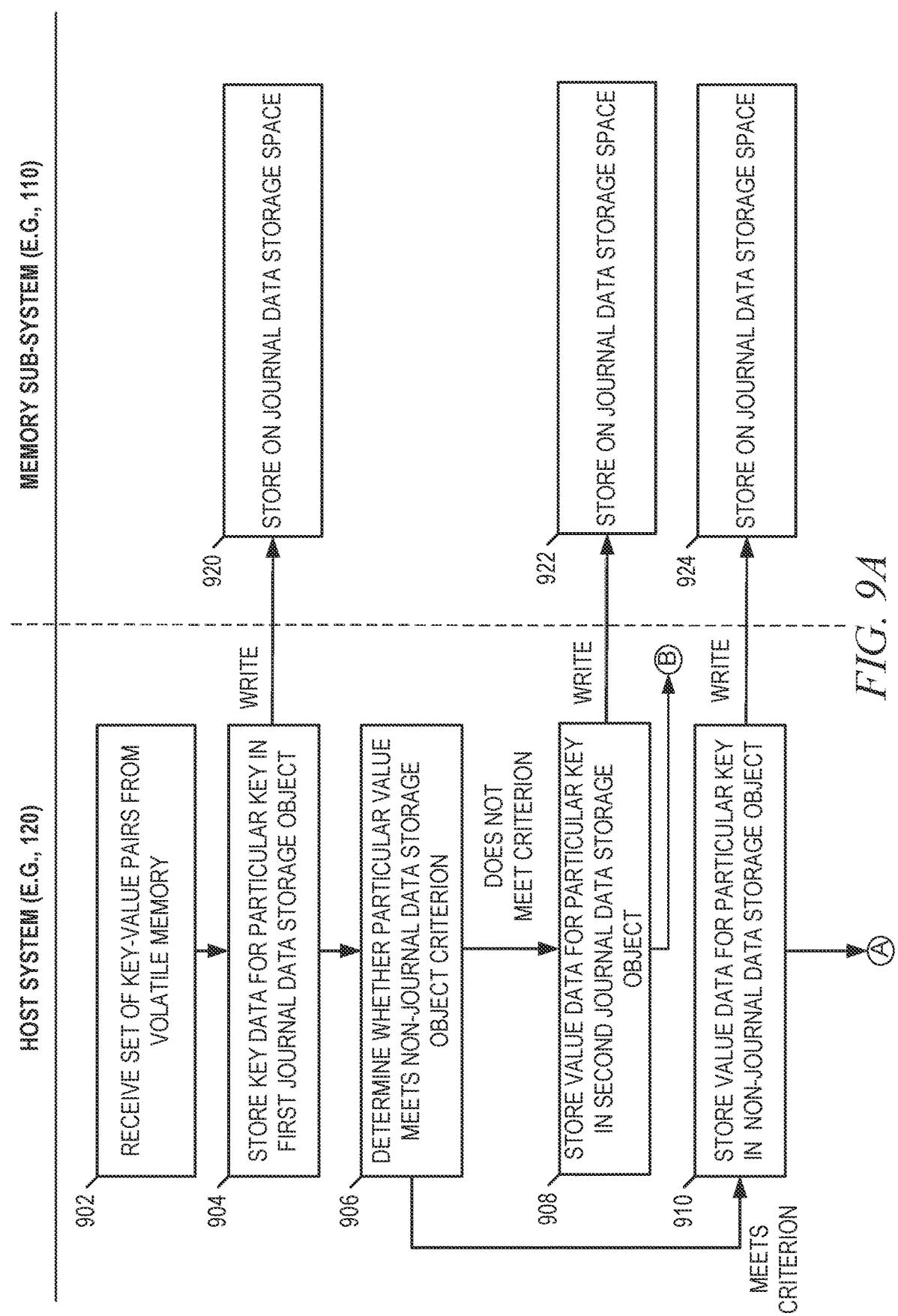
FIGS. 9A and 9B provide an interaction diagram illustrating interactions between components of a computing environment in the context of an example embodiment in which a method for a KVS that uses journaling is performed.
Figure 9B:
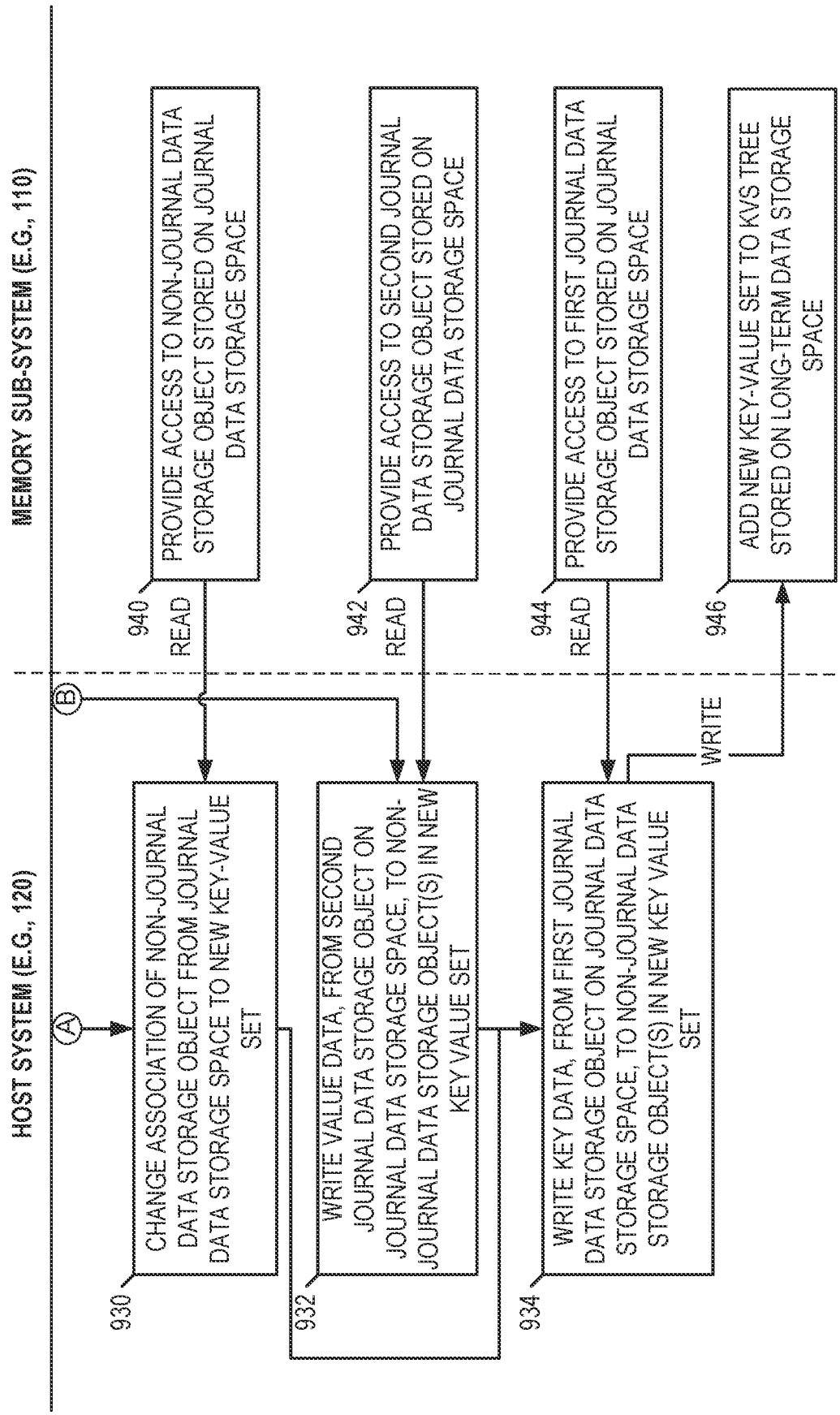

FIGS. 9A and 9B provide an interaction diagram illustrating interactions between components of the computing environment 100 in the context of an example embodiment in which a method for a KVS that uses journaling is performed. The operations of the method can be performed by processing logic that can includes hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the host system 120. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIGS. 9A and 9B, the host system can comprise the host system 120, and the memory sub-system can comprise the memory sub-system 110, where one or more of the memory components 112A to 112N can implement data storage media for providing journal data storage space and long-term data storage space as described herein.

As shown, at operation 902, the host system 120 receives a set of key-value pairs from volatile memory (e.g., of the host system 120). At operation 904, the host system 120 stores key data for a particular key of a particular key-value pair (in the set of key-value pairs received at operation 902) in a first journal data storage object, such as a metadata log, on the journal data storage space. As a result, at operation 920, the memory sub-system 110 stores the first journal data storage object on the journal data storage space.

At operation 906, the host system 120 determines whether a particular value of the key-value pair (in the set of key-value pairs received at operation 902) meets a non-journal data storage object criterion.

If it is determined (at operation 906) that the particular value does not meet the non-journal data storage object criterion, at operation 908, the host system 120 stores value data for the particular value in a second journal data storage object, such as a metadata log, on the journal data storage space. As a result, at operation 922, the memory sub-system 110 stores the second journal data storage object on the journal data storage space. Referring now to FIG. 9B, eventually, when the key data and the value data (stored on the journal data storage space by operations 904 and 908) move from the journal data storage space to the long-term data storage space, at operation 932, the host system 120 writes the value data, from the second journal data storage object on the journal data storage space, to non-journal data storage object(s) value block(s)) of a new kvset to be added to (e.g., a root node of) a KVS tree stored on the long-term data storage space. To facilitate this, at operation 942, the memory sub-system 110 provides the host system 120 with access to the second data storage object stored on the journal data storage space.

Continuing again with FIG. 9A, if it is determined (at operation 906) that the particular value meets the non-journal data storage object criterion, at operation 910, the host system 120 stores value data for the particular value in a non-journal data storage object, such as a value block, on the journal data storage space. As a result, at operation 924, the memory sub-system 110 stores the non-journal data storage object on the journal data storage space. Referring again to FIG. 9B, eventually when the key data and the value data (stored on the journal data storage space by operations 904 and 910) move from the journal data storage space to the long-term data storage space, the host system 120 changes association (e.g., ownership) of the second journal data storage object on the journal data storage space from the journal data storage space to the new kvset to be added to (e.g., a root node of) the KVS tree stored on the long-term data storage space at operation 930. To facilitate this, at operation 940, the memory sub-system 110 provides the host system 120 with access to the non-journal data storage object stored on the journal data storage space.

Following operation 930 or operation 932, at operation 934, the host system 120 moves, in operation 934, the key data from the journal data storage space to the long-term data storage space by writing the key data, from the first journal data storage object on the journal data storage space, to non-journal data storage object(s) (e.g., key block(s)) of the new kvset to be added to (e.g., a root node of) the KVS tree stored on the long-term data storage space. To facilitate this, at operation 944, the memory sub-system 110 provides the host system 120 with access to the first journal data storage object stored on the journal data storage space. Eventually, at operation 946, the memory sub-system 110 adds the new key-value set to the KVS tree stored on the long-term data storage space.

Figure 10:
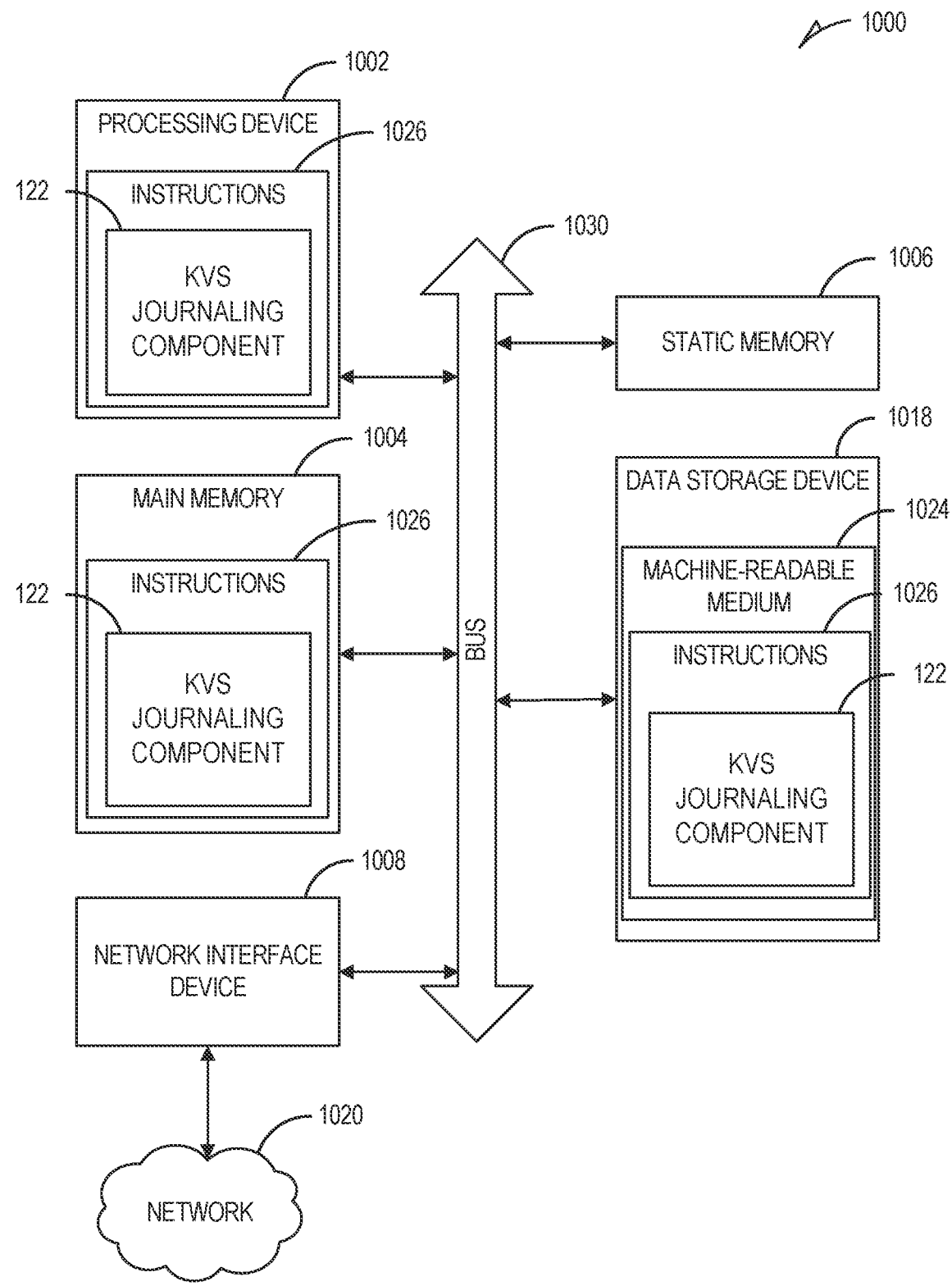
FIG. 10 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 10 illustrates an example machine in the form of a computer system 1000 within which a set of instructions can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the KVS journaling component 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or, jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an application specific integrated circuit (ASIC), a field programmable gate array (FPGA), a digital signal processor (DSP), a network processor, or the like. The processing device 1002 is configured to execute instructions 1026 for performing the operations and steps discussed herein. The computer system 1000 can further include a network interface device 1008 to communicate over a network 1020.

The data storage device 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage device 1018, and/or main memory 1004 can correspond to the memory sub-system 110 of FIG. 1.

In one embodiment, the instructions 1026 include instructions to implement functionality corresponding to a parity calculator with partial calculation tracking (e.g., the KVS journaling component 122 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMS); erasable programmable read-only memories (EPROMs); EEPROMs; magnetic or optical cards; or any type of media suitable tor storing electron instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from embodiments of the disclosure as set forth in the following claims. The specification and drawings are, accordingly, to be regarded in an illustrative sense rather than a restrictive sense.

EXAMPLES

Example 1 is a system comprising: a set of memory components providing a journal data storage space and a long-term data storage space; and a processing device, operatively coupled to the set of memory components, configured to perform operations comprising: receiving, from volatile memory, a set of key-value pairs; storing key data for a particular key, of a particular key-value pair in the set of key-value pairs, in a first journal data storage object on the journal data storage space; determining whether a particular value, of the particular key-value pair, meets a non-journal data storage object criterion; storing value data for the particular value, in at least one of a non-journal data storage object on the journal data storage space or a second journal data storage object on the journal data storage space, based on the determining whether the particular value meets the non-journal data storage object criterion; determining whether a condition, to move the key data and the value data from the journal data storage space, is satisfied; and in response to determining that the condition is satisfied, moving the key data and the value data from the journal data storage space to a new key-value set added to a node of a key-value store tree data structure, the key-value store tree being stored on the long-term data storage space, and the new key-value set comprising a first set of non-journal data storage objects for storing one or more keys and a second set of non-journal data storage objects for storing one or more values.

In Example 2, the subject matter of Example 1 optionally includes where the first journal data storage object comprises a metadata log.

In Example 3, the subject matter of Example 1 or Example 2 optionally includes where the non-journal data storage object comprises a value block, and the second set of non-journal data storage objects comprises a set of value blocks.

In Example 4, the subject matter of any one of Examples 1 to 3 optionally includes where the first set of non-journal data storage objects comprises a set of key blocks.

In Example 5, the subject matter of any one of Examples 1 to 4 optionally includes where the operations further comprise: in response to determining that the particular value meets the non-journal data storage object criterion, storing the value data in the non-journal data storage object on the journal data storage space.

In Example 6, the subject matter of any one of Examples 1 to 5 optionally includes where the moving the key data and the value data from the journal data storage space to the key-value store tree data structure comprises: moving the key data, from the journal data storage space to the key-value store tree data structure, by writing the key data, from the first journal data storage object on the journal data storage space, to one or more non-journal data storage objects in the first set of non-journal data storage objects; and moving the value data, from the journal data storage space to the key-value store tree data structure, by changing association of the non-journal data storage object from the journal data storage space to the key-value store tree data structure such that the second set of non-journal data storage objects includes the non-journal data storage object.

In Example 7, the subject matter of any one of Examples 1 to 6 optionally includes where the first journal data storage object and the non-journal data storage object are associated with a second key-value set in a sequence of key-value sets on the journal data storage space.

In Example 8, the subject matter of any one of Examples 1 to 7 optionally includes where the operations further comprise: in response to determining that the particular value does not meet the non-journal data storage object criterion, storing the value data in the second journal data storage object on the journal data storage space.

In Example 9, the subject matter of any one of Examples 1 to 8 optionally includes where the moving the key data and the value data from the journal data storage space to the key-value store tree data structure comprises: moving the key data, from the journal data storage space to the key-value store tree data structure, by writing the key data, from the first journal data storage object on the journal data storage space, to one or more non-journal data storage objects in the first set of non-journal data storage objects; and moving the value data, from the journal data storage space to the key-value store tree data structure, by writing the value data, from the second journal data storage object on the journal data storage space, to one or more non-journal data storage objects in the second set of non-journal data storage objects.

In Example 10, the subject matter of any one of Examples 1 to 9 optionally includes where the first journal data storage object and the second journal data storage object are associated with a second key-value set in a sequence of key-value sets on the journal data storage space.

In Example 11, the subject matter of any one of Examples 1 to 10 optionally includes where the set of key-value pairs is received from a second key-value set in a sequence of key-value sets on the volatile memory.

In Example 12, the subject matter of any one of Examples 1 to 11 optionally includes where the set of key-value pairs is received from a second key-value set on the volatile memory, the second key-value set comprising a binary tree data structure for storing the set of key-value pairs.

In Example 13, the subject matter of any one of Examples 1 to 12 optionally includes where the non-journal data storage object criterion comprises the particular value exceeding a value data size.

In Example 14, the subject matter of any one of Examples 1 to 13 optionally includes where the non-journal data storage object criterion comprises the particular key matching a target key that is associated with a historic write pattern, the historic write pattern indicating that, a number of write operations for the target key has exceeded a write threshold.

In Example 15, the subject matter of any one of Examples 1 to 14 optionally includes where the non-journal data storage object criterion comprises the particular value matching a target value that is associated with a historic write pattern, the historic write pattern indicating that a number of write operations for the target value has exceeded a write threshold.

In Example 16, the subject matter of any one of Examples 1 to 15 optionally includes where the condition comprises at least one of receiving of a request to flush data from the volatile memory to the journal data storage space, reaching a predetermined time interval, or satisfying a data size criterion relating to the volatile memory.

In Example 17, the subject matter of any one of Examples 1 to 16 optionally includes where the system is a memory sub-system.

Example 18 is a method comprising: receiving, from volatile memory, a set of key-value pairs; storing, by a processing device, key data for a particular key, of a particular key-value pair in the set of key-value pairs, in a first journal data storage object on a journal data storage space provided by a set of memory components; determining, by the processing device, whether a particular value, of the particular key-value pair, meets a non-journal data storage object criterion; based on the determining whether the particular value meets the non-journal data storage object criterion, storing, by the processing device, value data for the particular value, in at least one of a non-journal data storage object on the journal data storage space or a second journal data storage object on the journal data storage space; determining, by the processing device, whether a condition, to move the key data and the value data from the journal data storage space, is satisfied; and in response to determining that the condition is satisfied, moving, by the processing device, the key data and the value data from the journal data storage space to a new key-value set added to a node of a key-value store tree data structure, the key-value store tree being stored on a long-term data storage space provided by the set of memory components, and the new key-value set comprising a first set of non-journal data storage objects for storing one or more keys and a second set of non-journal data storage objects for storing one or more values.

In Example 19, the subject matter of Example 18 optionally includes where the journal data storage object comprises a metadata log, the non-journal data storage object comprises a value block, the first set of non-journal data storage objects comprises a set of key blocks, and the second set of non-journal data storage objects comprises a set of value blocks.

Example 20 is a non-transitory machine-readable storage medium comprising instructions that, when executed by a processing device, cause the processing device to: receive, from volatile memory, a set of key-value pairs; determine whether a particular value, of the particular key-value pair, meets a non-journal data storage object criterion; based on the determining whether the particular value meets the non-journal data storage object criterion, store value data for the particular value, in at least one of a non-journal data storage object on a journal data storage space or a second journal data storage object on the journal data storage space; determine whether a condition, to move key data and the value data from the journal data storage space, is satisfied; and in response to determining that the condition is satisfied, move the value data from the journal data storage space to a new key-value set added to a node of a key-value store tree data structure, the key-value store tree being stored on a long-term data storage space provided by a set of memory components, and the new key-value set comprising a first set of non-journal data storage objects for storing one or more keys and a second set of non-journal data storage objects for storing one or more values.

What is claimed is:

1. A system comprising:
   a set of memory components providing a journal data storage space and a long-term data storage space; and
   a processing device, operatively coupled to the set of memory components, configured to perform operations comprising:
   storing key data for an individual key of an individual key-value pair in a first journal data storage object on the journal data storage space;
   determining whether an individual value, of the individual key-value pair, meets a non-journal data storage object criterion; and
   based on the determining whether the individual value meets the non-journal data storage object criterion, storing value data for the individual value, in at least one of a non-journal data storage object on the journal data storage space or a second journal data storage object on the journal data storage space.

2. The system of claim 1, wherein the first journal data storage object comprises a metadata log.

3. The system of claim 1, wherein the operations further comprise:
   determining whether a condition, to move the key data and the value data from the journal data storage space, is satisfied; and
   in response to determining that the condition is satisfied, moving the key data and the value data from the journal data storage space to a new key-value set added to a node of a key-value store tree data structure, the key-value store tree data structure being stored on the long-term data storage space, and the new key-value set comprising a first set of non-journal data storage objects for storing one or more keys and a second set of non-journal data storage objects for storing one or more values.

4. The system of claim 3, wherein the non-journal data storage object comprises a value block, and the second set of non-journal data storage objects comprises a set of value blocks.

5. The system of claim 3, wherein the first set of non-journal data storage objects comprises a set of key blocks.

6. The system of claim 3, wherein the condition comprises at least one of receiving of a request to flush data from volatile memory to the journal data storage space, reaching a predetermined time interval, or satisfying a data size criterion relating to the volatile memory.

7. The system of claim 1, wherein the operations further comprise:
   in response to determining that the individual value meets the non-journal data storage object criterion, storing the value data in the non-journal data storage object on the journal data storage space.

8. The system of claim 7, wherein the first journal data storage object and the non-journal data storage object are associated with a key-value set in a sequence of key-value sets on the journal data storage space.

9. The system of claim 7, wherein the operations further comprise:
   determining whether a condition, to move the key data and the value data from the journal data storage space, is satisfied; and
   in response to determining that the condition is satisfied, moving the key data and the value data from the journal data storage space to a new key-value set added to a node of a key-value store tree data structure, the key-value store tree data structure being stored on the long-term data storage space, the new key-value set comprising a first set of non-journal data storage objects for storing one or more keys and a second set of non-journal data storage objects for storing one or more values, and the moving comprising:
   moving the key data, from the journal data storage space to the key-value store tree data structure, by writing the key data, from the first journal data storage object on the journal data storage space, to one or more non-journal data storage objects in the first set of non-journal data storage objects; and
   moving the value data, from the journal data storage space to the key-value store tree data structure, by changing association of the non-journal data storage object from the journal data storage space to the key-value store tree data structure such that the second set of non-journal data storage objects includes the non-journal data storage object.

10. The system of claim 1, wherein the operations further comprise:
    in response to determining that the individual value does not meet the non-journal data storage object criterion, storing the value data in the second journal data storage object on the journal data storage space.

11. The system of claim 10, wherein the first journal data storage object and the second journal data storage object are associated with a key-value set in a sequence of key-value sets on the journal data storage space.

12. The system of claim 10, wherein the operations further comprise:
    determining whether a condition, to move the key data and the value data from the journal data storage space, is satisfied; and in response to determining that the condition is satisfied, moving the key data and the value data from the journal data storage space to a new key-value set added to a node of a key-value store tree data structure, the key-value store tree data structure being stored on the long-term data storage space, the new key-value set comprising a first set of non-journal data storage objects for storing one or more keys and a second set of non-journal data storage objects for storing one or more values, and the moving comprising:

moving the key data, from the journal data storage space to the key-value store tree data structure, by writing the key data, from the first journal data storage object on the journal data storage space, to one or more non-journal data storage objects in the first set of non-journal data storage objects; and moving the value data, from the journal data storage space to the key-value store tree data structure, by writing the value data, from the second journal data storage object on the journal data storage space, to one or more non-journal data storage objects in the second set of non-journal data storage objects.

13. The system of claim 1, wherein a set of key-value pairs is received from a key-value set in a sequence of key-value sets on volatile memory.

14. The system of claim 1, wherein a set of key-value pairs is received from a key-value set on volatile memory, the key-value set comprising a binary tree data structure for storing the set of key-value pairs.

15. The system of claim 1, wherein the non-journal data storage object criterion comprises the individual value exceeding a value data size.

16. The system of claim 1, wherein the non-journal data storage object criterion comprises the individual key matching a target key that is associated with a historic write pattern, the historic write pattern indicating that a number of write operations for the target key has exceeded a write threshold.

17. The system of claim 1, wherein the non-journal data storage object criterion comprises the individual value matching a target value that is associated with a historic write pattern, the historic write pattern indicating that a number of write operations for the target value has exceeded a write threshold.

18. The system of claim 1, wherein the system is a memory sub-system.

19. A method comprising:

storing, by a processing device, key data for an individual key, of an individual key-value pair, in a first journal data storage object on a journal data storage space provided by a set of memory components;

determining, by the processing device, whether an individual value, of the individual key-value pair, meets a non-journal data storage object criterion; and based on the determining whether the individual value meets the non-journal data storage object criterion, storing, by the processing device, value data for the individual value, in at least one of a non-journal data storage object on the journal data storage space or a second journal data storage object on the journal data storage space.

20. A non-transitory machine-readable storage medium comprising instructions that, when executed by a processing device, cause the processing device to:

storing key data for an individual key, of an individual key-value pair, in a first journal data storage object on a journal data storage space provided by a set of memory components;

determining whether an individual value, of the individual key-value pair, meets a non-journal data storage object criterion; and based on the determining whether the individual value meets the non-journal data storage object criterion, storing value data for the individual value, in at least one of a non-journal data storage object on the journal data storage space or a second journal data storage object on the journal data storage space.

* * * * *